(12) United States Patent
Chen et al.

(10) Patent No.: US 9,311,557 B2
(45) Date of Patent: Apr. 12, 2016

(54) MOTION IMAGE REGION IDENTIFICATION DEVICE AND METHOD THEREOF

(75) Inventors: Haifeng Chen, Ishikawa (JP); Masashi Nakao, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 88 days.

(21) Appl. No.: 14/126,353

(22) PCT Filed: Dec. 1, 2011

(86) PCT No.: PCT/JP2011/077755
§ 371 (c)(1),
(2), (4) Date: Dec. 13, 2013

(87) PCT Pub. No.: WO2012/172706
PCT Pub. Date: Dec. 20, 2012

(65) Prior Publication Data
US 2014/0126827 A1    May 8, 2014

(30) Foreign Application Priority Data

Jun. 14, 2011  (JP) .................................. 2011-131926
Oct. 24, 2011  (JP) .................................. 2011-232571

(51) Int. Cl.
| G06K 9/00 | (2006.01) |
| H04N 5/225 | (2006.01) |
| G06K 9/46 | (2006.01) |
| G09G 5/34 | (2006.01) |
| G06T 7/20 | (2006.01) |

(52) U.S. Cl.
CPC ............ *G06K 9/4604* (2013.01); *G06T 7/2006* (2013.01); *G06T 7/2053* (2013.01); *G09G 5/34* (2013.01); *G06T 2207/10016* (2013.01); *G06T 2207/20021* (2013.01); *G09G 2320/106* (2013.01)

(58) Field of Classification Search
None
See application file for complete search history.

(56) References Cited

FOREIGN PATENT DOCUMENTS

| JP | 7-334616 A | 12/1995 |
| JP | 8-79767 A | 3/1996 |
| JP | 2001-76161 A | 3/2001 |
| JP | 2004-157818 A | 6/2004 |
| JP | 2006-24147 A | 1/2006 |
| JP | 2009-64199 A | 3/2009 |
| JP | 2009064199 | * 3/2009 |

OTHER PUBLICATIONS

International Search Report dated Feb. 21, 2012, as issued in corresponding International Patent Application No. PCT/JP2011/077755, filed Dec. 1, 2011 (with English translation—2 pages).

* cited by examiner

*Primary Examiner* — Randolph I Chu
(74) *Attorney, Agent, or Firm* — Maier & Maier, PLLC

(57) ABSTRACT

A rectangular moving image region is determined using a simple configuration. When the difference between the representative value of a unit block and the representative value of the same unit block in a comparative frame exceeds a threshold, moving unit block judgment means 5 judges that the unit block is a moving unit block. Moving column block determination means 7 defines a set of unit blocks included in a column including a certain unit block as a column block and, if a column block includes a moving unit block, determines the column block as a moving column block. When a row block includes a moving unit block, moving row block determination means 9 determines the row block as a moving column block. First rectangular moving image region determination means 11 determines, as a rectangular moving image region, a rectangular region specified by unit blocks included in both the moving row block and the moving column block.

16 Claims, 20 Drawing Sheets

1:RECTANGULAR MOVING IMAGE REGION DETERMINATION APPARATUS

HARDWARE CONFIGURATION

A
HORIZONTAL FILTER $$mask\_x = \begin{bmatrix} -1 & -1 & -1 \\ +1 & +1 & +1 \end{bmatrix}$$

HORIZONTAL EDGE $edge\_x = (|Y*mask\_x| + 2*|Cb*mask\_x| + 2*|Cr*mask\_x| > TH1) \& (|Y*mask\_y| + 2*|Cb*mask\_y| + 2*|Cr*mask\_y| > TH2)$

Fig. 18A

B
VERTICAL FILTER $$mask\_y = \begin{bmatrix} -1 & +1 \\ -1 & +1 \\ -1 & +1 \end{bmatrix}$$

VERTICAL EDGE $edge\_y = (|Y*mask\_y| + 2*|Cb*mask\_y| + 2*|Cr*mask\_y| > TH1) \& (|Y*mask\_x| + 2*|Cb*mask\_x| + 2*|Cr*mask\_x| > TH2)$

EDGE FRAME t

B

EDGE FRAME t+1

C

EDGE FRAME t+2

MOTION IMAGE REGION IDENTIFICATION DEVICE AND METHOD THEREOF

RELATED APPLICATIONS

This application is the U.S. national stage application under 35 U.S.C. §371 of International Patent Application No.: PCT/JP2011/077755, filed on Dec. 1, 2011, which claims priority under 35 U.S.C. §119, to Japanese Patent Application No.: 2011-131926, filed Jun. 14, 2011 and Japanese Patent Application No.: 2011-232571 filed Oct. 24, 2011, the disclosures of which are incorporated herein by reference in their entireties.

TECHNICAL FIELD

The present invention relates to a method for determining a moving image region and in particular to a method for determining a rectangular moving image region.

BACKGROUND ART

Nowadays, attention is being paid to a technology that increases of the resolution of an input moving image signal or still image signal and outputs the resulting signal. For example, if only the resolution of the moving image region can be increased in the display region, even a coarse input moving image can be displayed with improved viewability.

If such a moving image region is fixed, it can be identified manually. However, the identification process is troublesome. Of course, if the moving image region moves, there is a limit to identifying it manually.

There have been proposed various methods for identifying a moving image region. For example, Patent Document 1 discloses a method for determining a motion on a block basis. Specifically, the determination method includes: making a comparison between the gray levels of the same pixel in the preceding and following frames; if there is a difference between the gray levels, judging that the pixel is a moving-image pixel; obtaining the ratio of the number of the moving-image pixels to the number of all the pixels on a block basis; and if the ratio is greater than the threshold, judging that the block is a moving-image block.

PRIOR ART DOCUMENTS

Patent Documents

Patent Document 1: Japanese Unexamined Patent Application Publication No. 11-007266

SUMMARY OF THE INVENTION

Problems to be Solved by the Invention

However, in the determination method disclosed in Patent Document 1, a comparison is made for each pixel and then the number of pixels is counted for each block. Accordingly, it is necessary to make a comparison for each of all pixels in one frame, which would increase cost or design difficulty.

The present invention has been made to solve the above problem, and an object thereof is to provide a method and apparatus for determining a rectangular moving image region using a simple configuration.

Means for Solving the Problems (1) The present invention provides a method for determining a rectangular moving image region displayed in part of a display region, the display region having pixels arranged in row and column directions therein. The method includes: a moving unit block judgment step of dividing the display region into unit blocks each including a predetermined number of pixels and judging whether each unit block is a moving unit block having a motion; a moving column block determination step of defining, as a column block, a set of unit blocks included in a column including one of the uppermost unit blocks of the unit blocks and, if one column block includes at least one moving unit block, determining the column block as a moving column block; a moving row block determination step of defining, as a row block, a set of unit blocks included in a row including one of the leftmost unit blocks of the unit blocks and, if one row block includes at least one moving unit block, determining the row block as a moving row block; a first rectangular moving image region determination step of determining, as a rectangular moving image region, a rectangular region specified by unit blocks included in both the moving row block and the moving column block; and a second rectangular moving image region determination step of determining, as the rectangular moving image region, a region defined by edges in the rectangular moving image region on the basis of pixels in unit blocks forming peripheral four sides, of the unit blocks included in the rectangular moving image region.

As seen above, a moving image region can be determined by judging whether each of the unit blocks is a moving unit block, determining the moving row block and the moving column block, and determining, as a rectangular moving image region, the rectangular region specified by unit blocks included in both the moving row block and the moving column block. Further, a moving image region can be determined more precisely by determining, as the rectangular moving image region, a region defined by edges in the rectangular moving image region on the basis of pixels in unit blocks forming the peripheral four sides, of the unit blocks forming the region.

(2) In the method of the present invention, the second rectangular moving image region determination step includes determining a row having a different representative pixel value in the unit blocks forming the peripheral four sides as a row-direction boundary of the rectangular moving image region and determining a column having a different representative pixel value in the unit blocks forming the peripheral four sides as a column-direction boundary of the rectangular moving image region. In this way, it is possible to determine a boundary on the basis of the representative pixel value of each row.

(3) In the method of the present invention, the second rectangular moving image region determination step includes determining boundaries of the rectangular moving image region by judging whether each pixel in the unit blocks forming the peripheral four sides is a varying pixel which varies between different frames. In this way, it is possible to determine a boundary on the basis of the motion vector of each pixel.

(4) In the method of the present invention, the second rectangular moving image region determination step includes extracting pixels serving as row-direction edges and pixels serving as column-direction edges from pixels in the unit blocks forming the peripheral four sides and determining boundaries of the rectangular moving image region on the basis of a total number of pixels serving as row-direction edges in each row and a total number of pixels serving as column-direction edges in each column. In this way, it is possible to determine boundaries on the basis of the row-direction edge and the column-direction edge.

(5) In the method of the present invention, prior to the second rectangular moving image region determination step, a scroll judgment is performed in which it is judged whether an image in the determined rectangular moving image region varies between frames due to scrolling. In this way, it is possible to judge whether the image varies due to scrolling. If it is judged that the image varies due to scrolling, the second rectangular moving image region determination step is cancelled. Thus, when the image varies due to scrolling, it is possible to make a determination quickly.

(6) In the method of the present invention, the scroll judgment includes judging whether each of pixels in the determined rectangular moving image region serves as an edge, on the basis of a difference in pixel value between the pixel and an adjacent pixel, recognizing, as a character gap existence region, a row or column including a predetermined number or more of pixels not serving as edges, and judging whether the image varies due to scrolling, on the basis of a ratio of the character gap existence region to the determined rectangular moving image region. Thus, it is possible to reliably judge whether an image including characters is being scrolled.

(7) In the method of the present invention, before the second rectangular moving image region determination step is performed, the moving column block determination step, the moving row block determination step, and the first rectangular moving image region determination step are repeatedly performed on the rectangular moving image region determined in the first rectangular moving image region determination step. Thus, even when there are multiple moving image regions to be detected, detection can be performed accurately.

(8) The present invention provides an apparatus for determining a rectangular moving image region displayed in part of a display region, the display region having pixels arranged in row and column directions therein. The apparatus includes: 1) moving unit block judgment means configured to divide the display region into unit blocks each including a predetermined number of pixels and to judge whether each unit block is a moving unit block having a motion; 2) moving column block determination means configured to define, as a column block, a set of unit blocks included in a column including one of the uppermost unit blocks of the unit blocks and to, if one column block includes at least one moving unit block, determine the column block as a moving column block; 3) moving row block determination means configured to define, as a row block, a set of unit blocks included in a row including one of the leftmost unit blocks of the unit blocks and to, if one row block includes at least one moving unit block, determine the row block as a moving row block; 4) first rectangular moving image region determination means configured to determine, as a rectangular moving image region, a rectangular region specified by unit blocks included in both the moving row block and the moving column block; and 5) second rectangular moving image region determination means configured to determine, as the rectangular moving image region, a region defined by edges in the rectangular moving image region on the basis of pixels in unit blocks forming peripheral four sides, of the unit blocks included in the rectangular moving image region.

As seen above, a moving image region can be determined by judging whether each of the unit blocks is a moving unit block, determining the moving row block and the moving column block, and determining, as a rectangular moving image region, the rectangular region specified by unit blocks included in both the moving row block and the moving column block. Further, a moving image region can be determined more precisely by determining, as the rectangular moving image region, a region defined by edges in the rectangular moving image region on the basis of pixels in unit blocks forming the peripheral four sides, of the unit blocks forming the region.

(9) In the apparatus of the present invention, the second rectangular moving image region determination means preferably determines a row having a different representative pixel value in the unit blocks forming the peripheral four sides as a row-direction boundary of the rectangular moving image region and determines a column having a different representative pixel value in the unit blocks forming the peripheral four sides as a column-direction boundary of the rectangular moving image region. In this way, it is possible to determine a boundary on the basis of the representative pixel value of each row.

(10) In the apparatus of the present invention, the second rectangular moving image region determination means preferably determines boundaries of the rectangular moving image region by judging whether each pixel in the unit blocks forming the peripheral four sides is a varying pixel which varies between different frames. In this way, it is possible to determine a boundary on the basis of the motion vector of each pixel.

(11) In the apparatus of the present invention, the second rectangular moving image region determination means preferably extracts pixels serving as row-direction edges and pixels serving as column-direction edges from pixels in the unit blocks forming the peripheral four sides and determines boundaries of the rectangular moving image region on the basis of a total number of pixels serving as row-direction edges in each row and a total number of pixels serving as column-direction edges in each column. In this way, it is possible to determine boundaries on the basis of the row-direction edges and the column-direction edges.

(12) The apparatus of the present invention preferably further includes repetition means configured to cause the moving column block determination means, the moving row block determination means, and the first rectangular moving image region determination means to repeatedly perform processes on the rectangular moving image region determined by the first rectangular moving image region determination means. Thus, even when there are multiple moving image regions to be detected, detection can be performed accurately.

(17) The present invention provides a method for determining a rectangular moving image region displayed in part of a display region, the display region having pixels arranged in row and column directions therein. The method includes: a moving unit block judgment step of dividing the display region into unit blocks each including a predetermined number of pixels and judging whether each unit block is a moving unit block having a motion; a moving column block determination step of defining, as a column block, a set of unit blocks included in a column including one of the uppermost unit blocks of the unit blocks and, if one column block includes at least one moving unit block, determining the column block as a moving column block; a moving row block determination step of defining, as a row block, a set of unit blocks included in a row including one of the leftmost unit blocks of the unit blocks and, if one row block includes at least one moving unit block, determining the row block as a moving row block; and a first rectangular moving image region determination step of determining, as a rectangular moving image region, a rectangular region specified by unit blocks included in both the moving row block and the moving column block.

As seen above, a moving image region can be determined by judging whether each of the unit blocks is a moving unit block, determining the moving row block and the moving column block, and determining, as a rectangular moving image region, the rectangular region specified by unit blocks included in both the moving row block and the moving column block.

(18) In the method of the present invention, the first rectangular moving image region determination step preferably further includes repeatedly performing the moving column block determination step and the moving row block determination step on the determined rectangular region. Thus, even when there are multiple moving image regions to be detected, detection can be performed accurately.

(19) The present invention provides an apparatus for judging whether a target region to be determined in a screen is a scrolled region. The apparatus includes: edge pixel judgment means configured to judge whether each pixel in the target region serves as an edge, on the basis of a difference in pixel value between the pixel and an adjacent pixel; character gap existence region determination means configured to determine a row or column including a predetermined number or more of pixels not serving as edges, as a character gap existence region; and scrolled region judgment means configured to judge whether the target region is a scrolled region, on the basis of a ratio of the character gap existence region to the target region.

Thus, it is possible to reliably judge whether an image including characters is being scrolled.

(20) The present invention provides an apparatus for determining boundaries of a rectangular region in a screen. The apparatus includes: edge pixel judgment means configured to judge whether each of target pixels to be determined is a pixel serving as an edge, on the basis of a value of each pixel; row-direction boundary determination means configured to extract, as row-direction edge pixels, pixels serving as row-direction edges, to calculate a total number of the row-direction edge pixels in each row, and to determine a row-direction boundary on the basis of the total number of the row-direction edge pixels in each row; column-direction boundary determination means configured to extract, as column-direction edge pixels, pixels serving as column-direction edges, to calculate a total number of the column-direction edge pixels in each column, and to determine a column-direction boundary on the basis of the total number of the column-direction edges in each column; and rectangular region determination means configured to determine the determined row-direction boundary and column-direction boundary as boundaries of the rectangular region.

In this way, it is possible to determine boundaries on the basis of the row-direction edge and the column-direction edge.

(21) The boundary determination apparatus of the present invention preferably further includes coarse region determination means configured to determine the target pixels with respect to which the edge pixel judgment means is to make judgments and including the following means.

1) Moving unit block judgment means configured to divide a display region into unit blocks each including a predetermined number of pixels, the display region having pixels arranged in row and column directions therein, and to judge whether each unit block is a moving unit block having a motion;

2) Moving column block determination means configured to define, as a column block, a set of unit blocks included in a column including one of the uppermost unit blocks of the unit blocks and to, if one column block includes at least one moving unit block, determine the column block as a moving column block;

3) Moving row block determination means configured to define, as a row block, a set of unit blocks included in a row including one of the leftmost unit blocks of the unit blocks and to, if one row block includes at least one moving unit block, determine the row block as a moving row block;

4) First rectangular moving image region determination means configured to determine, as a rectangular moving image region, a rectangular region specified by unit blocks included in both the moving row block and the moving column block; and 5) Target pixel determination means configured to determine, as the target pixels, pixels included in unit blocks forming peripheral four sides, of the unit blocks included in the rectangular moving image region.

Thus, it is possible to determine a boundary more quickly.

In the present specification, "the pixel value" refers to the luminance value, as well as all values for specifying image information, including the RGB value. "A rectangular moving image region" refers to a rectangular region where the pixel value varies among multiple frames and which forms a moving image region.

"A column block" refers to a set of unit blocks included in a column including one of the uppermost unit blocks of the unit blocks. In the present embodiment, a column block is determined by specifying one of the uppermost unit blocks. Alternatively, a column block may be determined by specifying a unit block in a row other than the uppermost row, as long as the column block consequently includes one of the uppermost unit blocks. "A row block" refers to a set of unit blocks included in a row including one of the leftmost unit blocks. As with a column block, a unit block may be specified in any manner to determine a row block, as long as the row block consequently includes one of the leftmost unit blocks.

"The first rectangular moving image region determination step" and "the second rectangular moving image region determination step" correspond to the moving image region determination process (step S7 of FIG. 3) and the boundary determination process (step S9 of FIG. 3), respectively, in the embodiments.

"The row direction" refers to the direction in which the rows are arranged, and corresponds to the direction a in the embodiments. "A row-direction edge" refers to an edge parallel to the row direction, and "a column-direction edge" refers to an edge parallel to the column direction.

BRIEF DESCRIPTION OF THE DRAWINGS

FIGS. 18A and 18B show a filter and a formula used to judge whether a pixel is an edge pixel.

EMBODIMENTS

Embodiments of the present invention will be described with reference to the drawings.

1.1 Function Blocks

Figure 1:
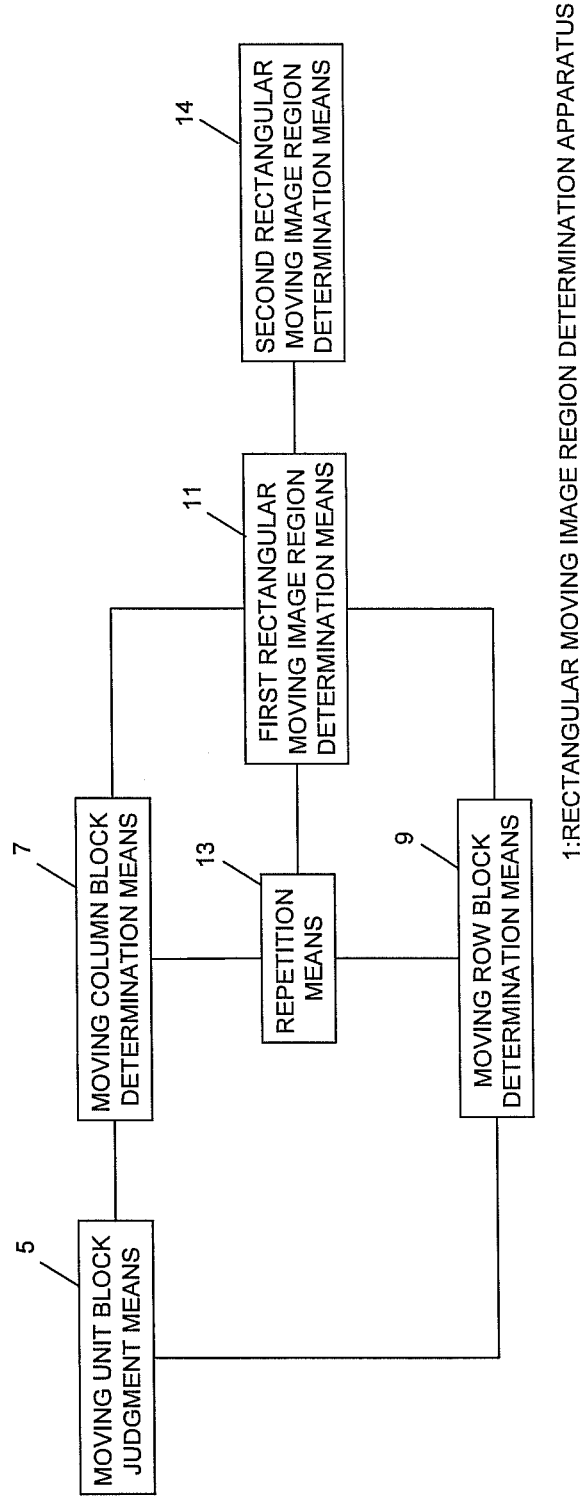
FIG. 1 is a function block diagram of a rectangular moving image region determination apparatus 1.

FIG. 1 shows a function block diagram of a rectangular moving image region determination apparatus 1 of one embodiment of the present invention. The rectangular moving image region determination apparatus 1 is configured to determine a rectangular moving image region displayed in part of a display region having pixels arranged in row and column directions therein. It includes moving unit block judgment means 5, moving column block determination means 7, moving row block determination means 9, first rectangular moving image region determination means 11, repetition means 13, and second rectangular moving image region determination means 14.

The moving unit block judgment means 5 divides the display region into unit blocks each including a predetermined number of pixels and judges whether each unit block is a moving unit block having a motion. The moving column block determination means 7 defines, as a column block, a set of unit blocks included in a column including one of the uppermost unit blocks of the unit blocks and, if one column block includes at least one moving unit block, determines that the column block is a moving column block. The moving row block determination means 9 defines, as a row block, a set of unit blocks included in a row including one of the leftmost unit blocks and, if one row block includes at least one moving unit block, determines that the row block is a moving row block. The first rectangular moving image region determination means 11 determines that a rectangular region specified by unit blocks included in both the moving row block and the moving column block is a rectangular moving image region. The repetition means 13 causes the moving column block determination means 7, the moving row block determination means 9, and the first rectangular moving image region determination means 11 to repeatedly perform processes on the rectangular moving image region determined by the first rectangular moving image region determination means 11. Based on pixels in unit blocks forming the peripheral four sides, of the unit blocks forming the rectangular moving image region, the second rectangular moving image region determination means 14 determines that a region defined by edges in the rectangular moving image region is the rectangular moving image region.

1.2 Hardware Configuration

Figure 2:
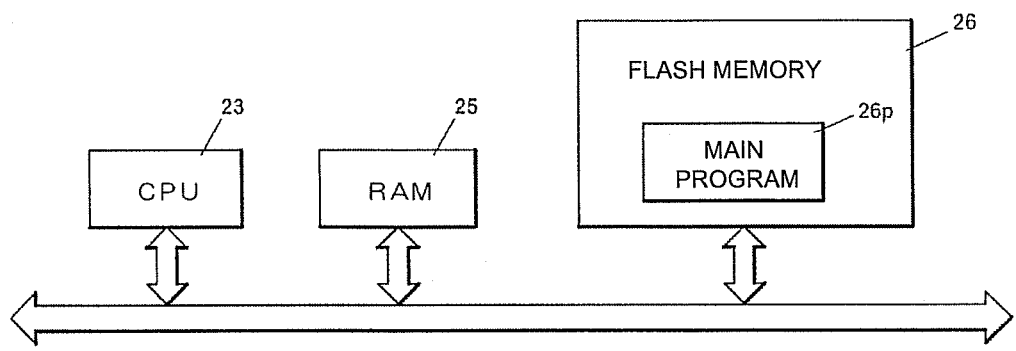
FIG. 2 is a diagram showing an example hardware configuration of the rectangular moving image region determination apparatus 1 including a CPU.

FIG. 2 shows the hardware configuration of the rectangular moving image region determination apparatus 1. The rectangular moving image region determination apparatus 1 includes a CPU 23, a RAM 25, and a flash memory 26. The flash memory 26 is storing a program 26p. The program 26p performs a rectangular moving image region determination process, as will be described later. The RAM 25 is storing a calculation result or the like. A frame memory 27 is storing image data of one screen.

Under the program 26p, the CPU 23 judges whether an image region is a moving image region, which includes moving pixels, on the basis of the values of the pixels forming the display region stored in the memory 27, and then stores the determination result in the RAM 25.

1.3 Description of Flowchart

A process performed by the program 26p shown in FIG. 2 will be described with reference to FIG. 3. In the following description, there is used an example shown in FIG. 4, in which an image region 100 serving as one frame of a monitor includes three rectangular moving image regions, 110 to 112.

In the image region 100, pixels are arranged in a row direction α and in a column direction β.

Figure 3:
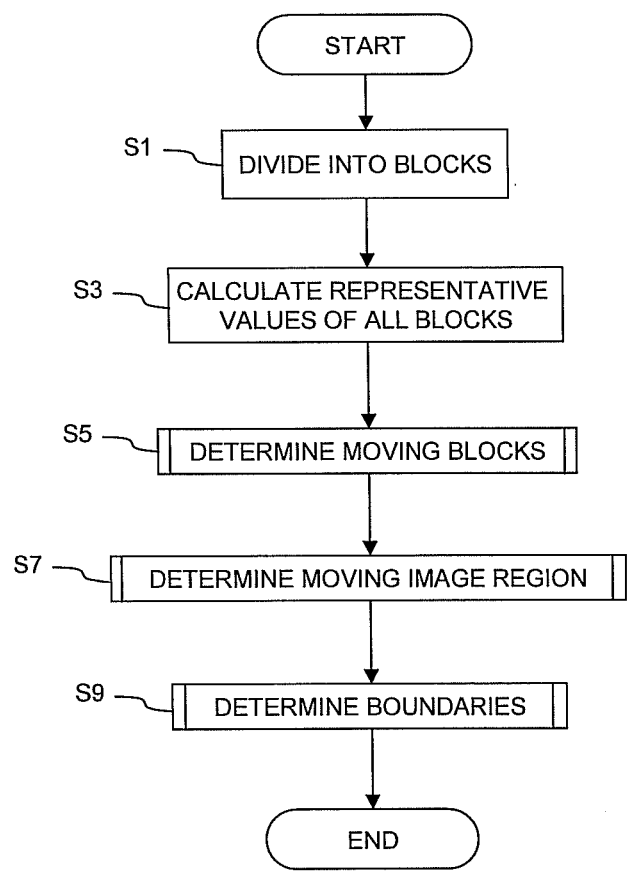
FIG. 3 is an overall flowchart.
Figure 4:
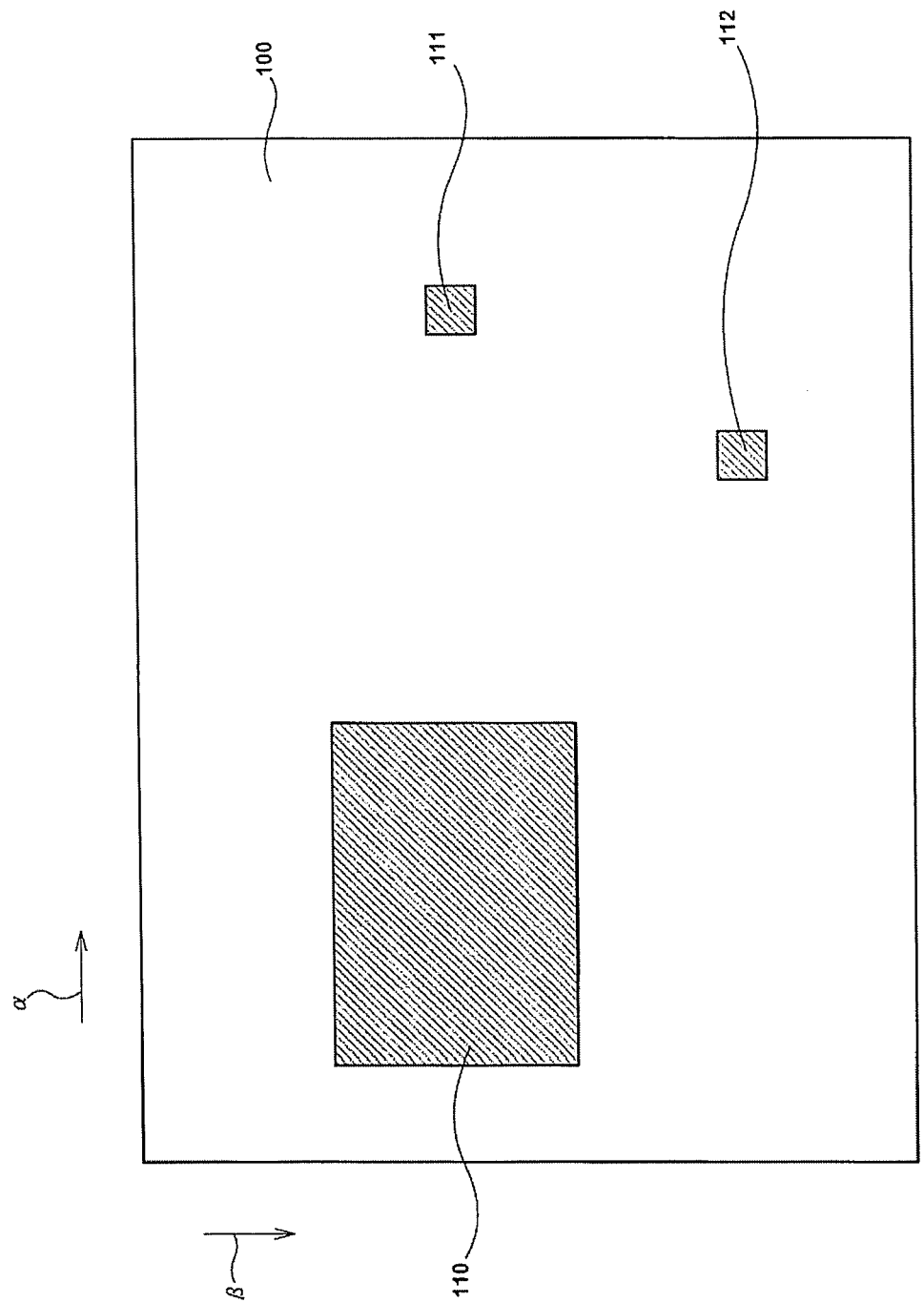
FIG. 4 shows a display region 100 including moving image regions 110 to 112.

The CPU 23 divides the display region into blocks (step S1 of FIG. 3). In the present embodiment, the display region 100 shown in FIG. 4 is divided into multiple blocks each including 32*32 pixels in a matrix form. Hereafter, it is assumed that the display region 100 is divided into n+1 blocks in the direction α and m+1 blocks in the direction β.

The CPU 23 determines the representative values of all the blocks (step S3 of FIG. 3). Examples of the representative value include the average of the pixel values in one block and the value of the first pixel in one block. Instead of using the pixel value as it is, a hash value, such as CRC, may be used as the representative value. While the average value can be represented with an 18-bit length in a 32*32*8-bit image, the centered 8 bits obtained by discarding the upper and lower 10 bits may be used as the average value. Thus, the representative values of the (n+1)*(m+1) blocks are stored in the RAM 25.

The CPU 23 judges whether each of the (n+1)*(m+1) blocks is a moving block (step S5). The moving block determination process will be described with reference to FIG. 5.

Figure 5:
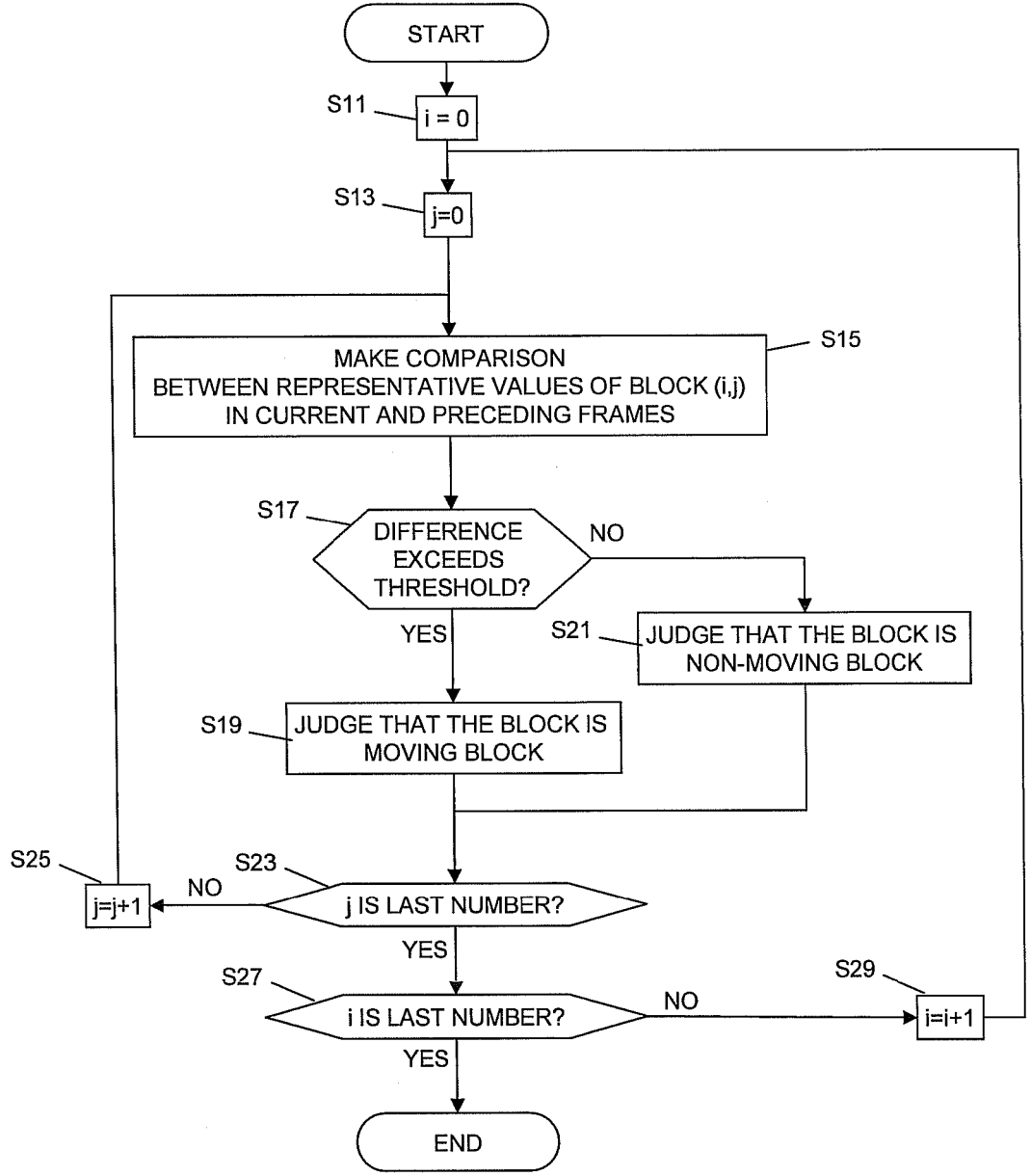
FIG. 5 is a flowchart of a moving block determination process.

The CPU 23 initializes process block numbers i, j (step S11, S13 of FIG. 5). A comparison is made between the representative values of block (0,0) in the current and preceding frames (step S15). In the present embodiment, a comparison is made between the representative values at times t and t−1. The CPU 23 judges whether the difference between the representative values exceeds a threshold thb (step S17). If the difference exceeds the threshold thb, it judges that the block is a moving block (step S19). In contrast, if the difference does not exceed the threshold thb, the CPU 23 judges that the block is a non-moving block (step S21).

The CPU 23 judges whether process block number j is the last number (step S23). Since j is 0 and therefore is not the last number, the CPU 23 increments process block number j (step S25) and repeats steps S15 and later. If process block number j is the last number in step S23, the CPU 23 proceeds to step S27 and judges whether process block number i is the last number. Since i is not the last number, the CPU 23 increments process block number i (step S29) and repeats steps S13 and later. If process block number i is the last number in step S27, the CPU 23 ends the moving block determination process.

Figure 6:
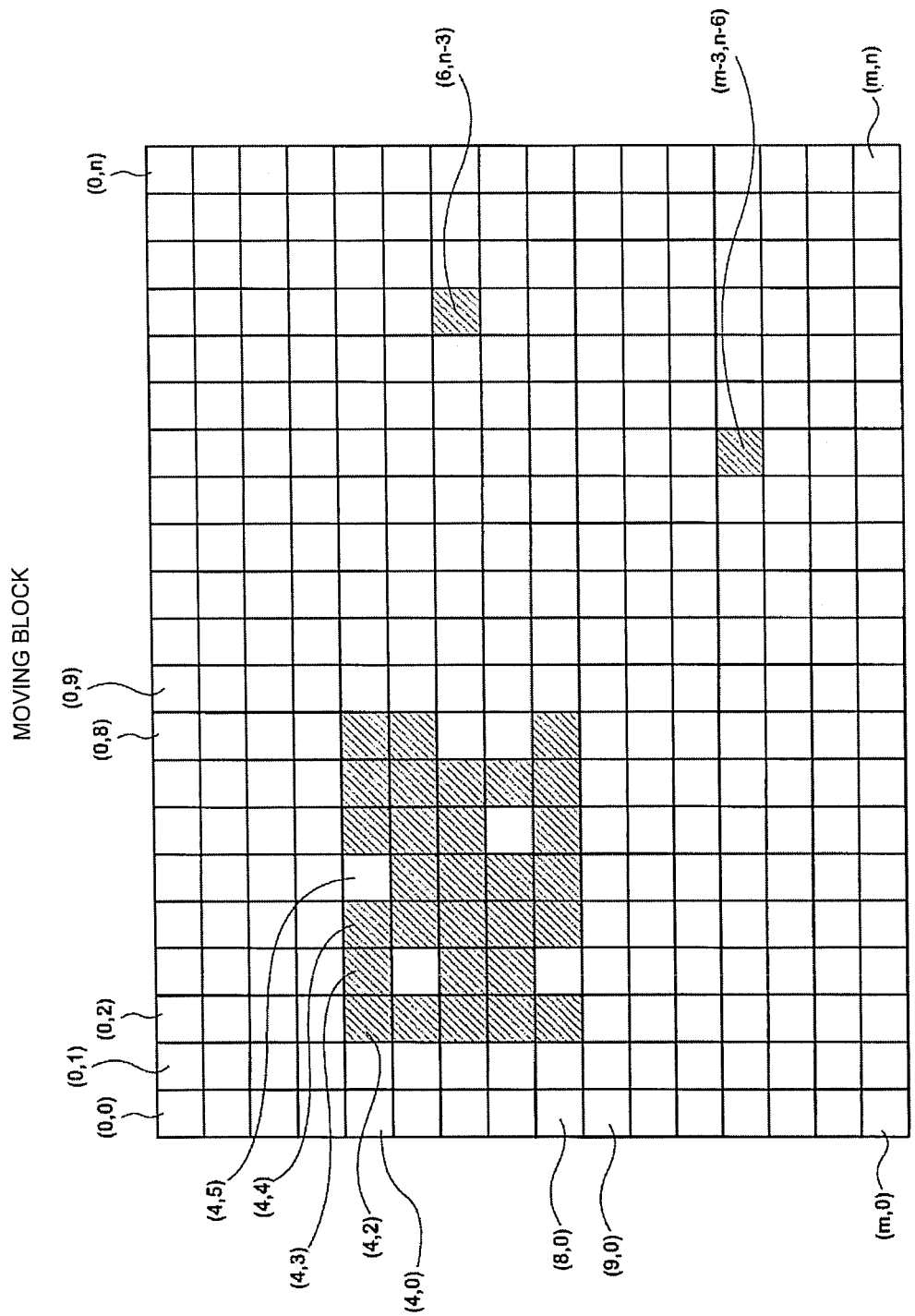
FIG. 6 is a diagram showing a detection result of moving blocks.

FIG. 6 shows judgment results of whether each of the (n+1)*(m+1) blocks is a moving block. In this example, the blocks (4,2), (4,3), (4,4), and the like are determined to be moving blocks.

The CPU 23 performs the moving image region determination process (step S7 of FIG. 3). The moving image region determination process will be described with reference to FIGS. 7 and 9.

Figure 7:
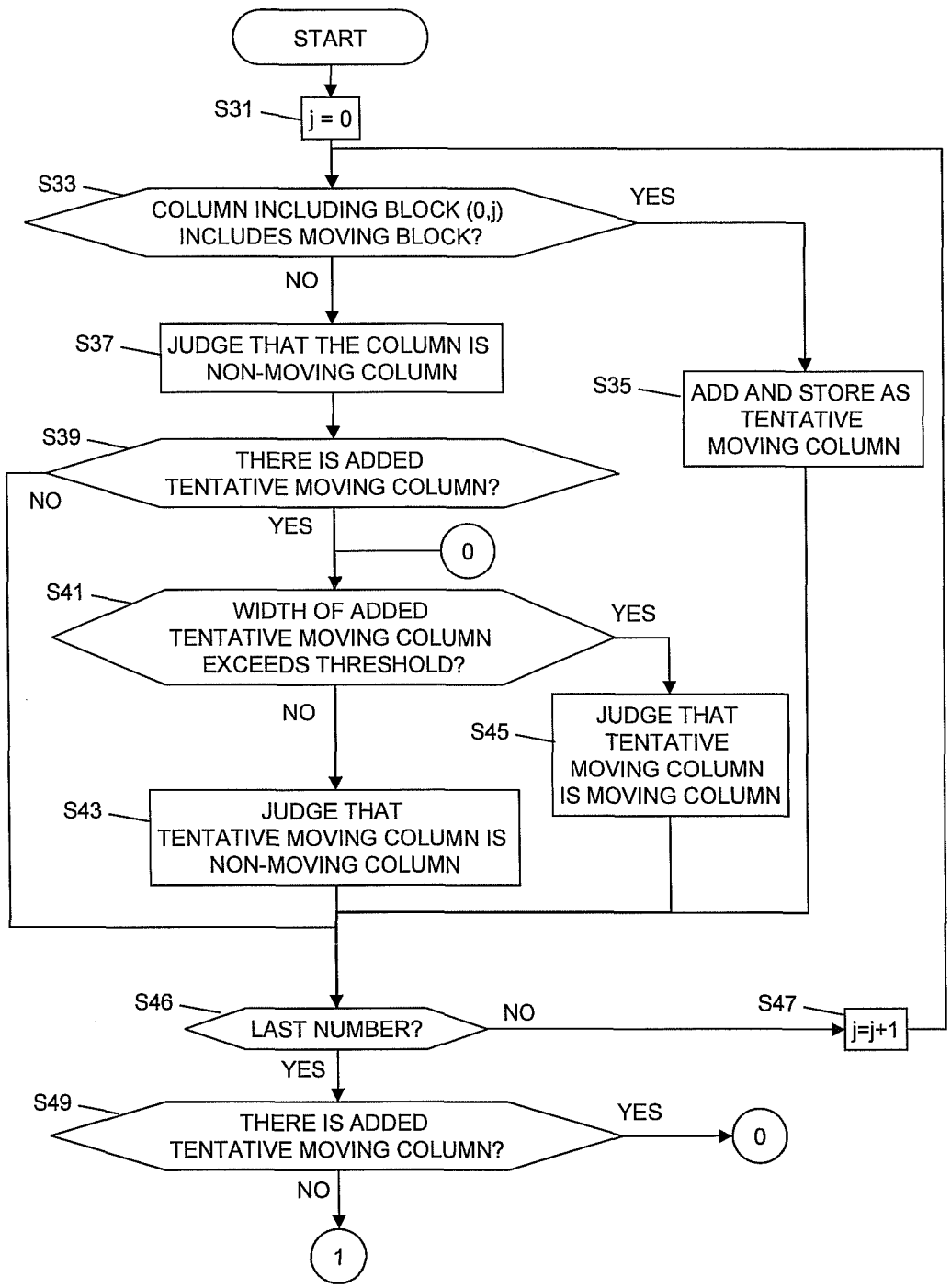
FIG. 7 is a flowchart of a moving image region determination process.

The CPU 23 initializes process block number j (step S31 of FIG. 7). The CPU 23 then judges whether the column block including block (0,0) includes at least one moving block (step S33). Since there is no moving block among block (0,0) and blocks (1,0) to (m,0) vertically arranged from block (0,0), as shown in FIG. 6, the CPU 23 judges that this column is a non-moving column (step S37 of FIG. 7). The CPU 23 then judges whether there is an added and stored tentative moving column (step S39). Since there is no such column, the CPU 23 proceeds to step S46 and judges whether process block number j is the last number. Since j is 0 and therefore is not the last number, the CPU 23 increments process block number j (step S47) and repeats steps S33 and later.

When process block number j=2, there are moving blocks among block (0,2) and blocks vertically arranged from block (0,2). Accordingly, the CPU 23 adds and stores this column as a tentative moving column (step S35).

The CPU 23 judges whether process block number j is the last number (step S46). Since j is 2 and therefore is not the last number, the CPU 23 increments process block number j (step S47) and repeats steps S33 and later.

Until process block number j becomes 8, the CPU 23 repeats step S35. When process block number j=9, there is no moving block in the column including block (0,9). Accordingly, the CPU 23 judges that this column is a non-moving column (step S37). The CPU 23 judges whether there are added and stored tentative moving columns (step S39). If such columns exist, it judges whether the set of adjacent columns has a width exceeding a threshold thw (step S41). In the present embodiment, it is assumed that the threshold thw is two blocks or more. Since blocks (0,2) to (0,8) are added and stored tentative moving columns and exceed the threshold thw, the CPU 23 determines that the tentative moving columns are moving columns (step S45).

The CPU 23 judges whether process block number j is the last number (step S46).

When process block number j=10, the column of block (0,10) includes no moving block. Accordingly, the CPU 23 judges that the column is a non-moving column (step S37). The CPU 23 then judges whether there is a detected tentative moving column (step S39). Since there is no such column, the CPU 23 judges whether process block number j is the last number (step S46).

Subsequently, until j becomes n−7, the CPU 23 judges that the column is a non-moving column. When process block number j=n−6, a moving block (m−3,n−6) exists. Accordingly, the CPU 23 adds and stores this column as a tentative moving column (step S35).

When process block number j=n−5, the column including block (0,n−5) includes no moving block. Accordingly, the CPU 23 judges that this column is a non-moving column (step S37). The CPU 23 then judges whether there are detected tentative moving columns (step S39). If such columns exist, it judges whether the set of adjacent columns has a width exceeding the threshold thw (step S41). Since it is assumed in the present embodiment that the threshold thw is two blocks or more, the width of the tentative moving column does not exceed the threshold thw. Accordingly, the CPU 23 judges that the tentative moving column is a non-moving column (step S43). Thus, it is possible to prevent an image region, such as a mouse, from erroneously being recognized as a moving image region.

Similarly, the CPU 23 sequentially judges whether each column in the row direction α includes a moving block.

Note that the last column, the column including block (0,n), may be a tentative moving column. In this case, the CPU 23 judges in step S49 whether there are added and stored tentative moving columns. If such columns exist, it performs steps S41 and later.

Figure 8:
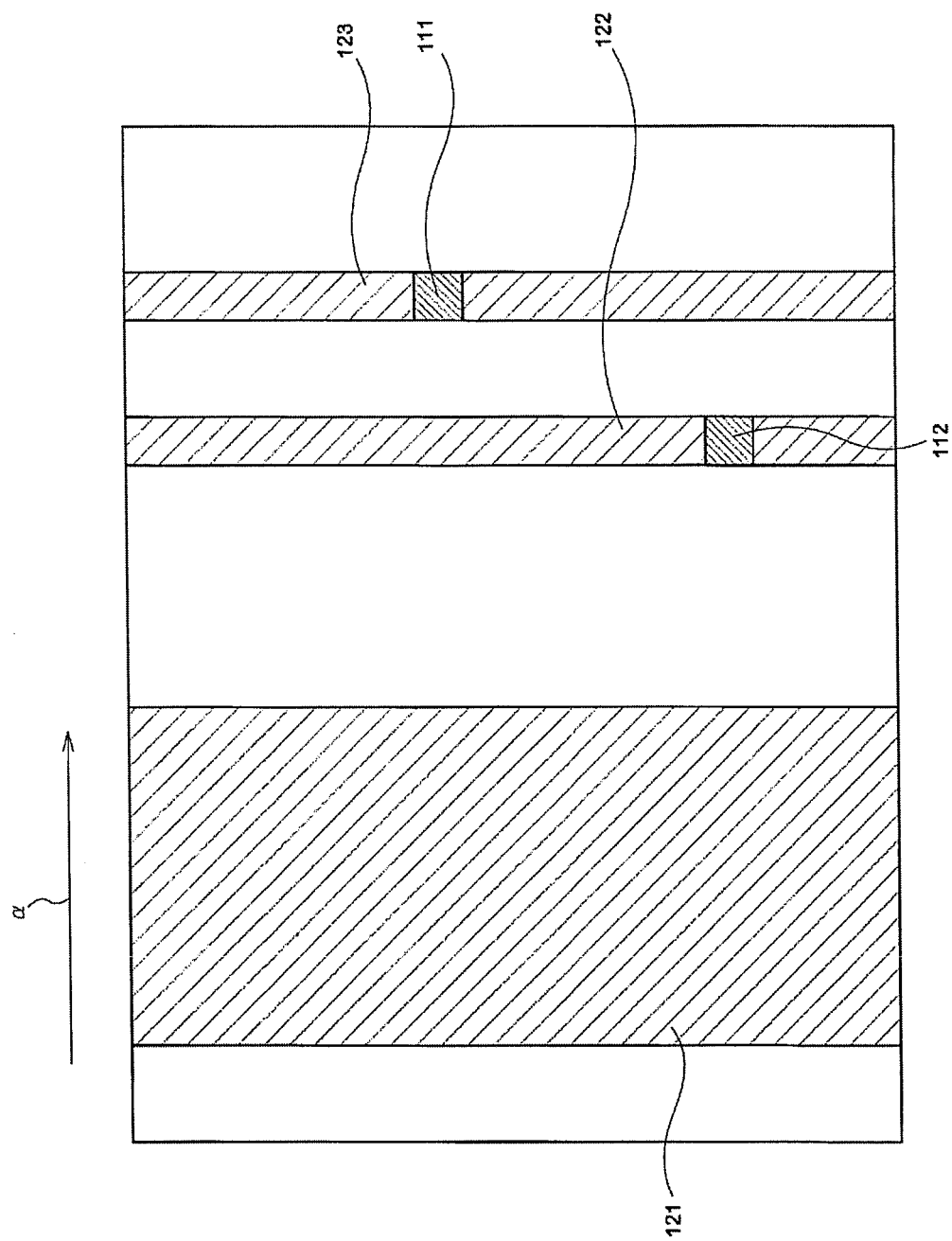
FIG. 8 is a diagram showing moving column blocks.

FIG. 8 shows detected moving columns. In this case, a region 121 is determined as a moving column. On the other hand, none of regions 122 and 123 including block (m−3,n−6) and block (6,n−3), respectively, has a width exceeding the threshold thw in the direction of arrow α. Accordingly, these regions are not determined to be moving columns.

Figure 9:
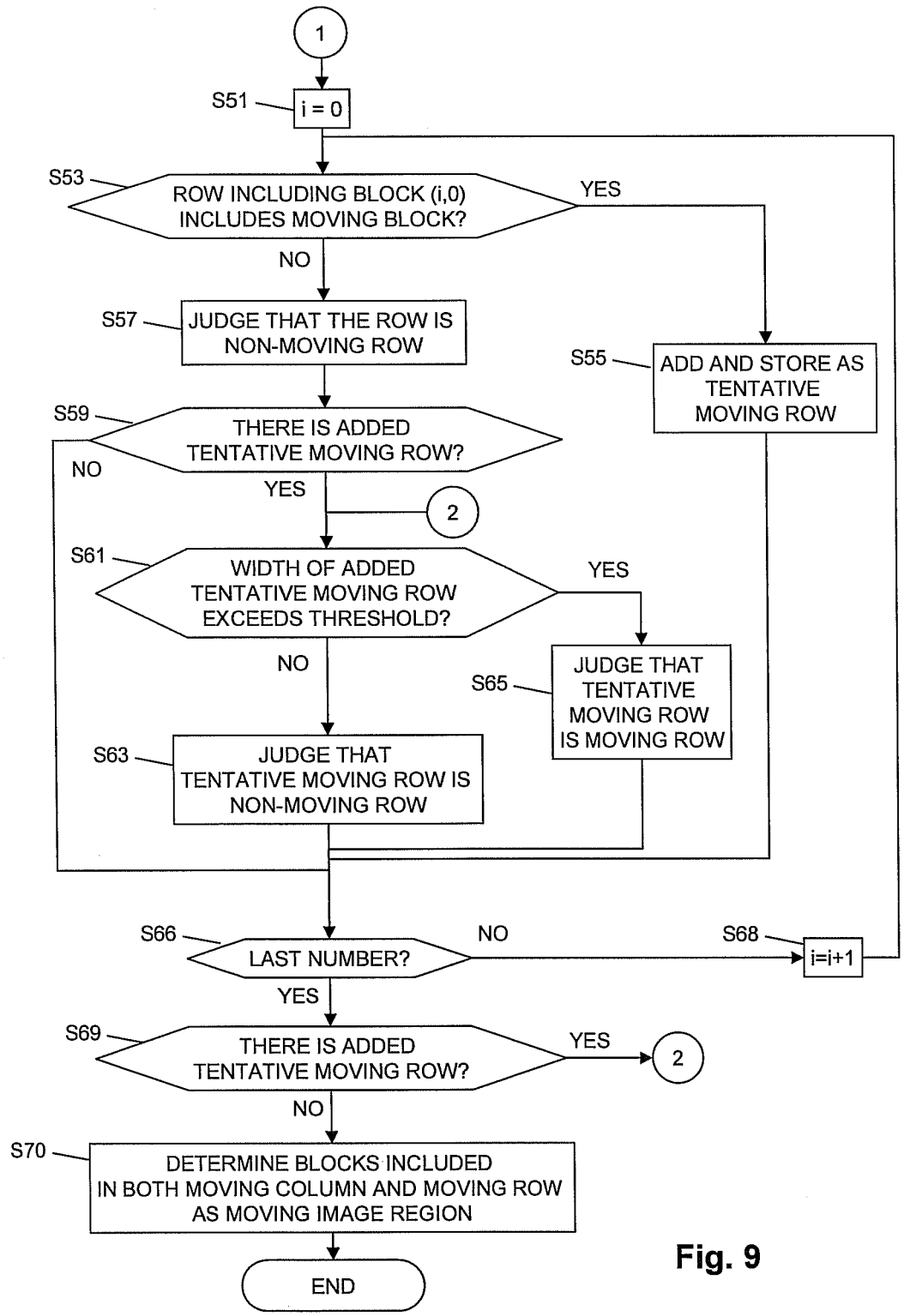
FIG. 9 is a flowchart (continued) of the moving image region determination process.

The CPU 23 then initializes process block number i (step S51 of FIG. 9). The CPU 23 judges whether the row including block (0,0) includes at least one moving block (step S53). Since block (0,0) and blocks (0,1) to (0,n) horizontally arranged from block (0,0) include no moving block, as shown in FIG. 6, the CPU 23 judges that this row is a non-moving row (step S57). The CPU 23 then judges whether there are added and stored moving rows (step S59). Since there is no detected moving row, the CPU 23 proceeds to step S66 and judges whether process block number i is the last number. Since i is 0 and therefore is not the last number, the CPU 23 increments process block number i (step S68) and repeats steps S53 and later.

When process block number i=4, the row including block (4,0) includes moving blocks. Accordingly, the CPU 23 adds and stores this row as a tentative moving row (step S55).

Similarly, until i becomes 8, the CPU 23 judges that the row including block (i,0) is a moving row, which includes moving blocks. When i=9, the row including block (i,0) includes no moving block. Accordingly, the CPU 23 judges that this row is a non-moving row (step S57). The CPU 23 then judges whether there are added and stored moving rows (step S59). Since added and stored moving rows exist, the CPU 23 judges whether the set of added and stored moving rows has a width exceeding the threshold thw (step S61). In the present embodiment, it is assumed that the threshold thw is two blocks or more. Since blocks (4,0) to (8,0) are detected moving rows and have a width exceeding the threshold thw, the CPU 23 judges that the tentative moving rows are moving rows (step S65).

Similarly, the CPU 23 sequentially judges whether each row in the column direction β is a moving block. Step S69 is similar to step S49 and therefore will not be described.

Figure 10:
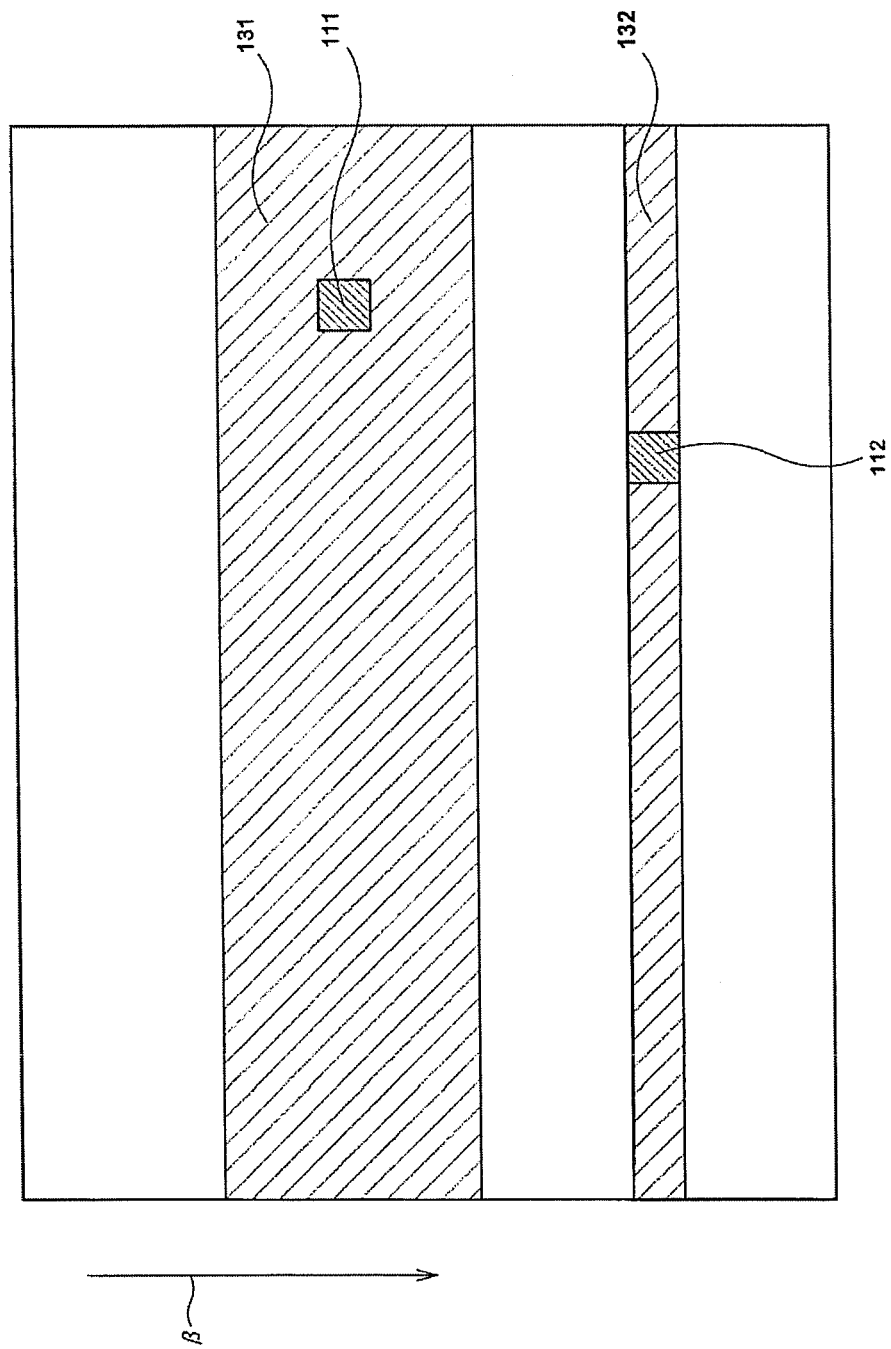
FIG. 10 is a diagram showing moving row blocks.

FIG. 10 shows a detected moving row. Specifically, a region 131 is determined as a moving row. Moving block (6,n−3) is included in the region 131. On the other hand, a region 132 including moving block (m−3,n−6) does not have a width exceeding the threshold thw in the direction of arrow β and therefore is not determined to be a moving row.

The CPU 23 determines that the blocks included in both the moving column and the moving row are a moving image region (step S70 of FIG. 9). Specifically, the blocks included in a region 140 where the regions 121 and 131 shown in FIG. 11 overlap each other are determined to be a moving image region. Compared to the moving blocks in FIG. 6, moving blocks (6,n−3) and (m−3,n−6) are excluded, while block (4,5) and the like are determined to a moving image region. Thus, a failure to include blocks can be prevented in relation to adjacent blocks.

The CPU 23 performs a boundary determination process (step S9 of FIG. 3). In the region 140 shown in FIG. 11, blocks each including 32*32 pixels serve as the boundaries of the moving image region. By performing step S9, a single pixel-based boundary 150 of the moving image region as shown in FIG. 13 can be obtained. Details of step S9 will be described with reference to FIG. 12.

Figure 12:
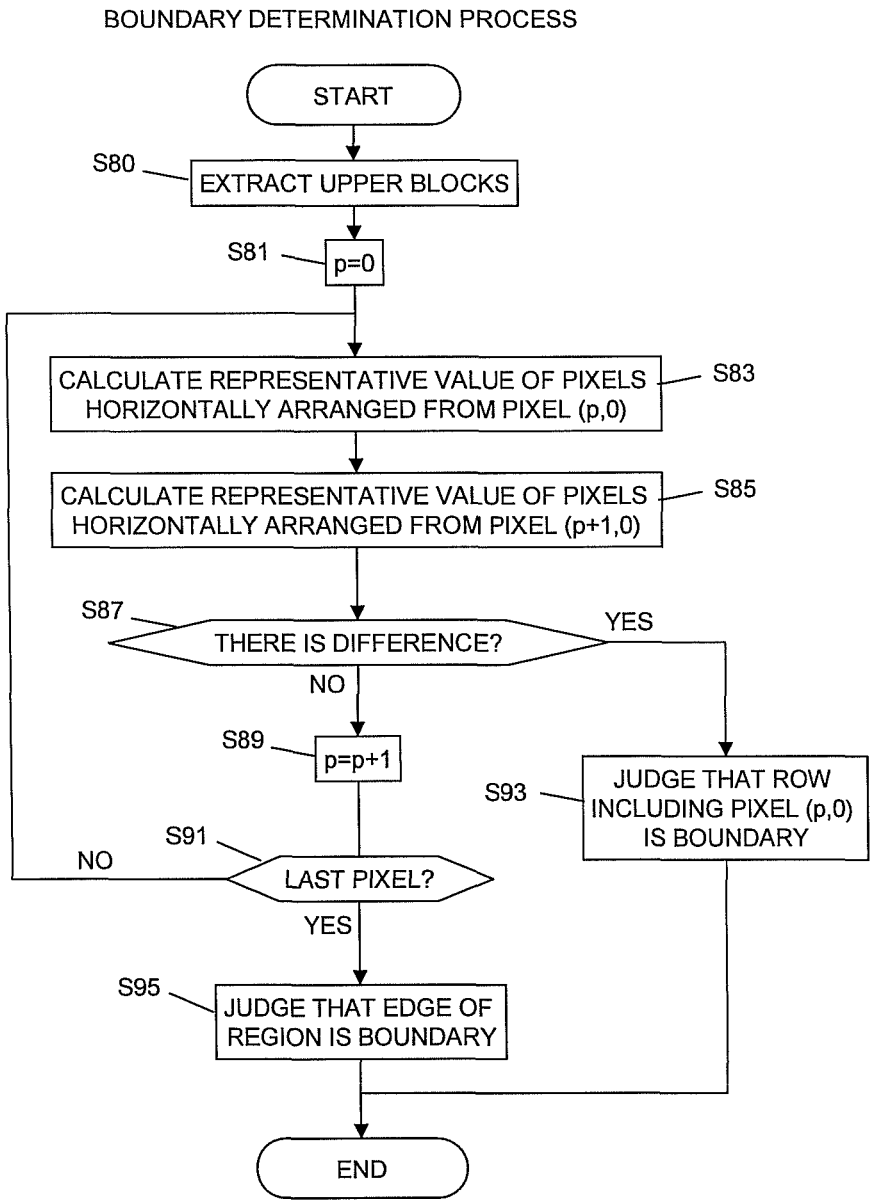
FIG. 12 is a flowchart of a boundary determination process.
Figure 13:
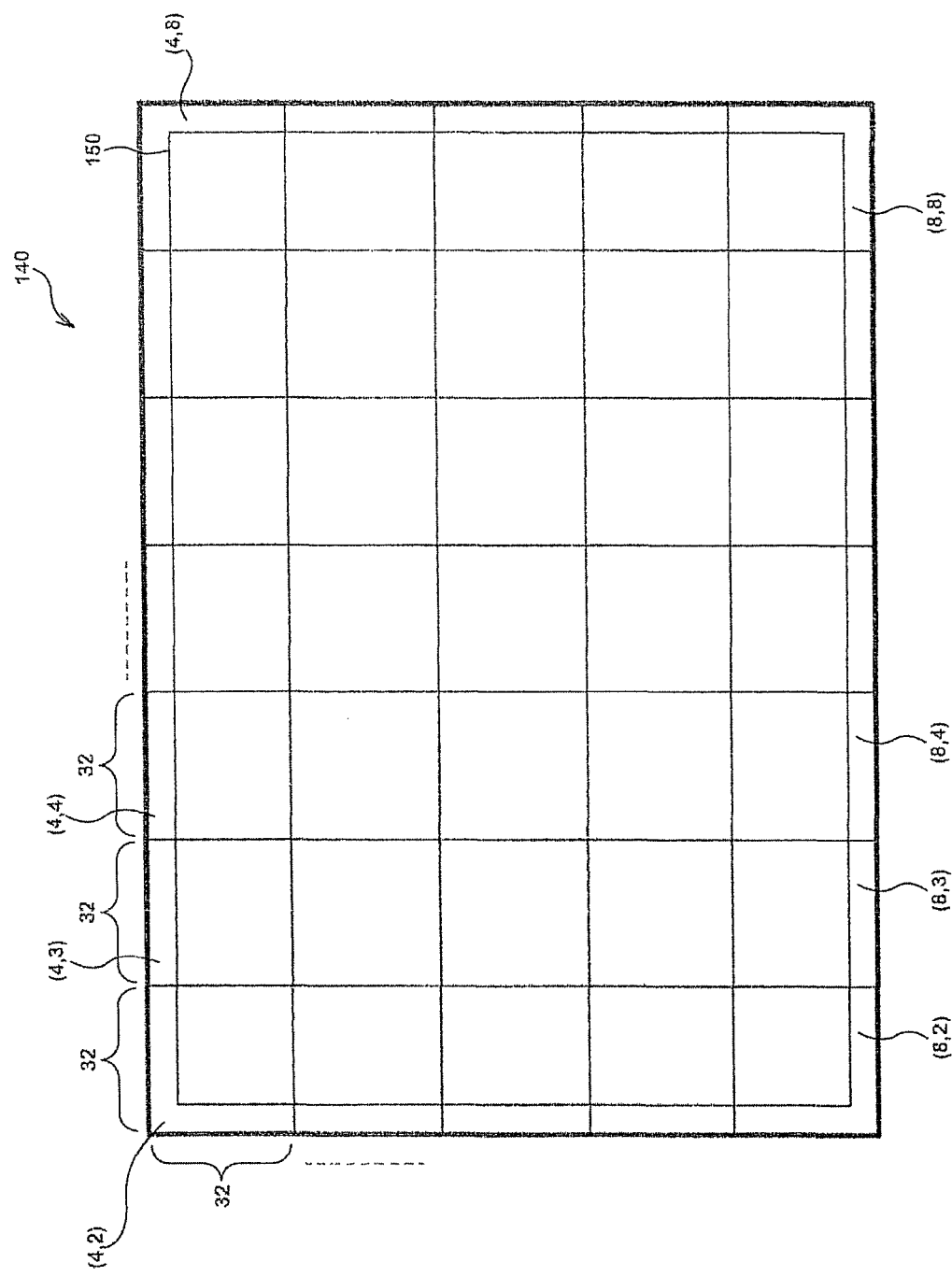
FIG. 13 is a diagram showing 32*32 pixels in one unit block.

The CPU 23 extracts upper blocks (step S80 of FIG. 12). Specifically, it extracts a total of seven blocks, blocks (4,2) to (4,8), shown in FIG. 13. The CPU 23 then initializes process row number P (step S81) and extracts all pixels in the P'th row of the extracted blocks and calculates the representative value thereof (step S83). Specifically, it extracts 32 pixels in the 0'th row of block (4,2), 32 pixels in the 0'th row of block (4,3), and the like, that is, 7*32 pixels and calculates the representative values of the row. In the present embodiment, the average of the extracted pixels is used as the representative value.

The CPU 23 then extracts all pixels in process row number P+1'th row of the extracted blocks and calculates the representative value of the row (step S85). Specifically, the CPU 23 extracts 32 pixels in the 1'st row of block (4,2), 32 pixels in the 1'st row of block (4,3), and the like, that is, 7*32 pixels and calculates the representative value of the row.

The CPU 23 then judges whether there is a difference between the representative value calculated in step S83 and the representative value calculated in step S85 (step S87). If there is a difference between both in step S87, the CPU 23 judges that the row including pixel (P,0) serves as a boundary (step S93). If there is no difference between both in step S87, the CPU 23 increments process row number P (step S89) and repeats steps S83 and later until reaching the last pixels (in this case, 32 pixels) in the extracted blocks (step S91). If there is no difference between the representative value of the second last pixels and the representative value of the last pixels in step S87, the CPU 23 judges that the ends of the extracted blocks form a boundary (step S95).

While the case where the single pixel-based boundary is extracted from the upper blocks has been described in FIG. 12, the same applies to the lower blocks.

As seen above, by horizontally extracting the pixels in each row of the peripheral upper or lower blocks and making a comparison between the representative values of each row and an adjacent row, it is possible to obtain a single pixel-based boundary in the blocks.

For the left or right boundary, it is only necessary to vertically extract the pixels in each column and to make a comparison between the representative values of each column and an adjacent column.

The present apparatus can automatically detect a moving image region. Further, this detection can be performed in as few as several frames. Thus, even when a moving image region itself dynamically moves on the monitor, the present apparatus can detect the moving image region almost in real time.

2. Second Embodiment

Figure 14:
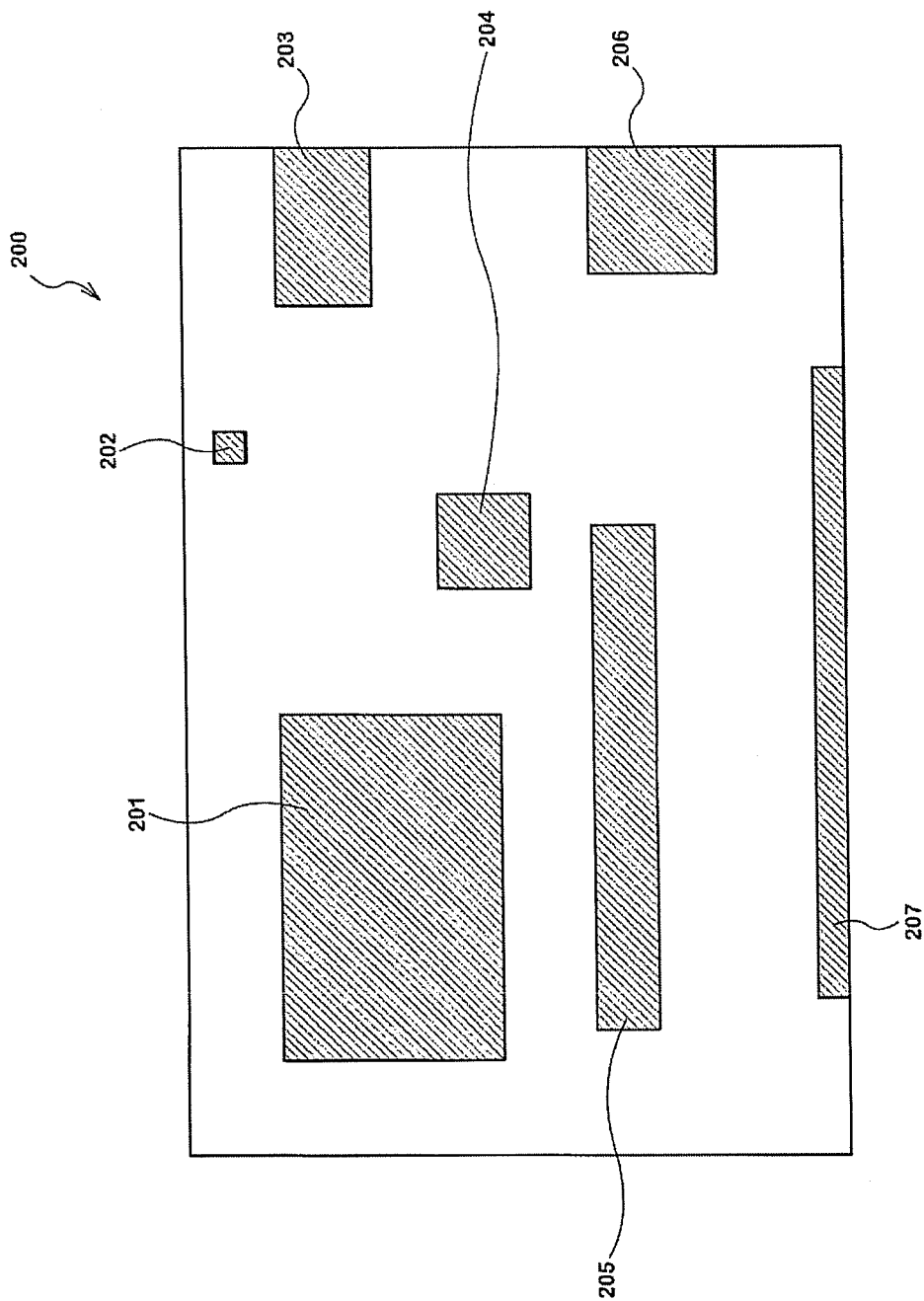
FIG. 14 shows a display region 200 including many moving image regions.

In the above embodiment, there has been described the example in which the number of regions to be detected is one. In a second embodiment, step S7 of FIG. 3, that is, the moving image region determination process is repeated. Thus, even multiple moving image regions, 201 to 207, as shown in FIG. 14, can be detected.

Figure 15:
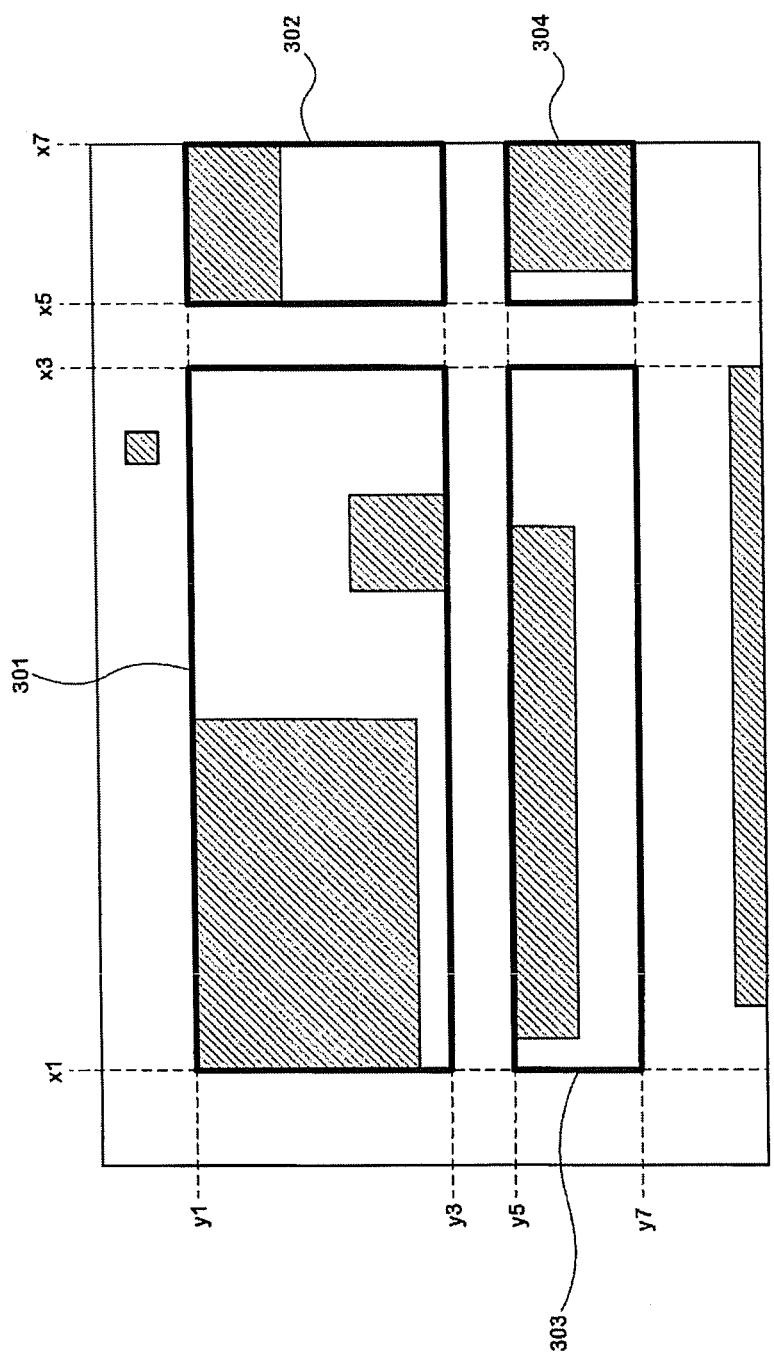
FIG. 15 shows detected moving image regions 301 to 304.
Figure 16:
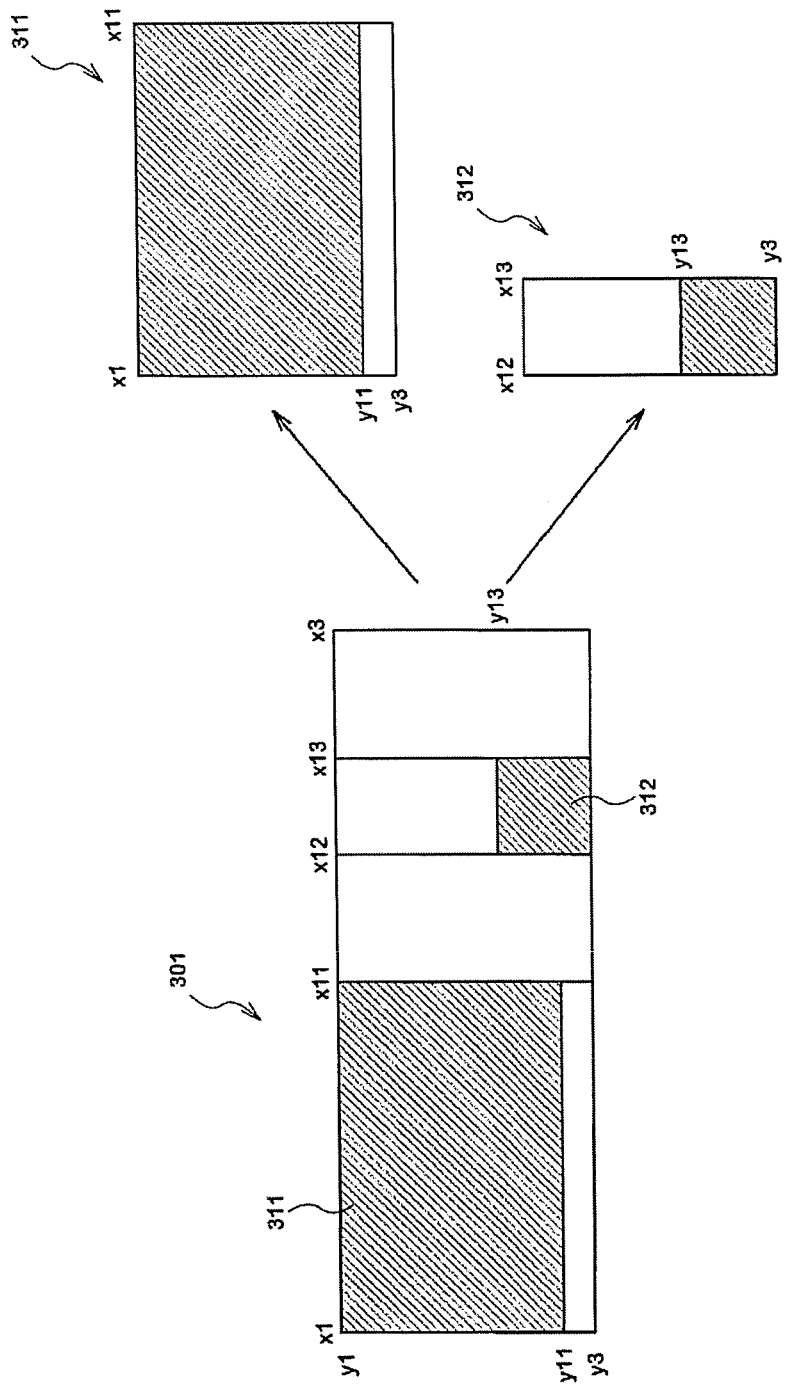
FIG. 16 shows moving image regions 311 and 312 detected from the moving image region 301.

Once step S7 of FIG. 3 is performed, moving image regions 301 to 304 as shown in FIG. 15 are determined. The region 207 is judged not to have a width exceeding the threshold thw and therefore is not detected as a moving image region.

In this state, the moving image region 301 includes non-moving image regions. Accordingly, the CPU 23 regards each of the regions 301 to 304 as a collective image region and detects moving image regions again. Thus, in the region 301, for example, a region 311 defined by block coordinates (y1, x1) and (y3,x11) and a region 312 defined by block coordinates (y1,x12) and (y3,x13) are detected. The same goes for the other regions, 302 to 304.

Similarly, the CPU 23 regards the region 311 as a collective image region and detects moving image regions again. Thus, a region defined by block coordinates (y1,x1) and (y11,x11) is detected. The same goes for the region 312.

Such repeated detection may be performed until further division becomes impossible, or the upper limit frequency of repeated detection may be determined in advance.

3. Third Embodiment

In the first and second embodiments, blocks are detected; the representative values of the rows of the unit blocks forming the peripheral four sides of the detected blocks are obtained; and if there is a difference between the representative values of one row and an adjacent row, the row is judged to be a boundary. The same goes for the columns. Alternatively, a boundary may be detected as follows. The alternative boundary detection method will be described with reference to FIG. 17.

Figure 17:
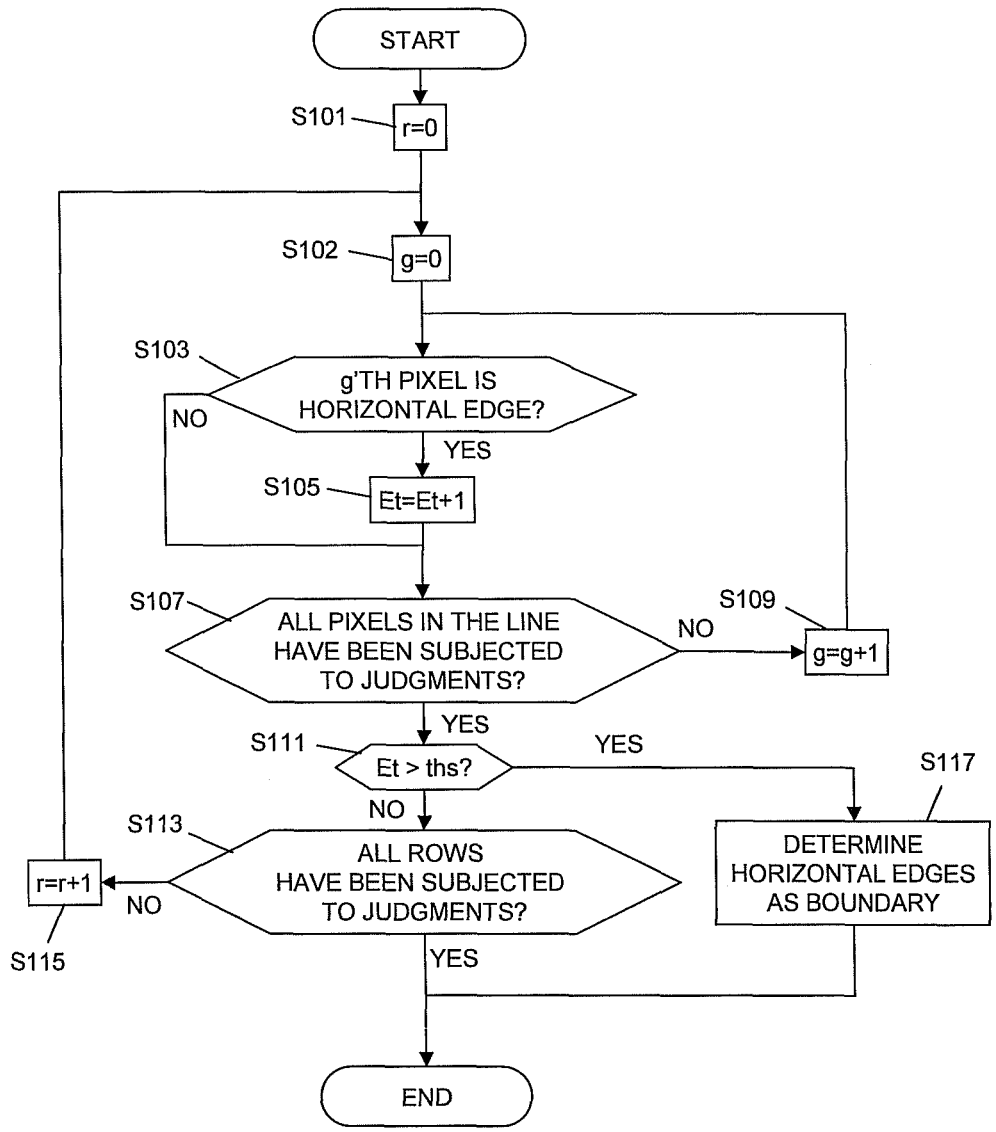
FIG. 17 is a flowchart of a boundary determination process.

The CPU 23 extracts blocks other than blocks serving as ends from the upper blocks (step S100 of FIG. 17). Specifically, the CPU 23 extracts a total of five blocks, blocks (4,3) to (4,7), shown in FIG. 13. The reason why the ends are excluded as described above is that parts of the blocks serving as both ends may not have an edge. Note that the end blocks may also be used.

The CPU 23 initializes process row number r and process pixel number g (steps S101, S102 of FIG. 17) and judges whether the g-th pixel of the extracted block of row number "0" is a horizontal-edge pixel (row-direction edge) (step S103). Whether the g'th pixel is a horizontal-edge pixel may be determined based on the difference in luminance between the g'th pixel and an adjacent pixel. In the present embodiment, a filter and formula as shown in FIG. 18A are employed.

If the CPU 23 judges that the g'th pixel is a horizontal-edge pixel, it increments a total number Et (step S105 of FIG. 17). The CPU 23 then judges whether all pixels in this line have been subjected to the determination process (step S107). If not, the CPU 23 increments process pixel number g (step S109) and repeats steps S103 to S107.

After the CPU 23 judges whether each of all pixels in this line is a horizontal edge, it judges whether the total number Et of the horizontal edges in this line exceeds a predetermined threshold ths (step S111). This is done to exclude horizontal-edge pixels serving as parts of an outline in the moving image region. If the total number Et of the horizontal edges exceeds the threshold ths, the CPU 23 determines that the horizontal edges form a boundary (step 117). In this way, the boundary in which the set of horizontal edges exceeds the threshold ths can be obtained.

The threshold ths may be a fixed threshold or may be calculated according to a predetermined ratio and the size (the number of blocks) of the detected region.

If "NO" in step S111, the CPU 23 judges whether all rows have been subjected to the determination process (step S113). If all the rows have not been subjected, the CPU 23 increments process row number r and repeats steps S102 to S111.

In this way, a single pixel-based boundary can be determined. Similarly, a single pixel-based boundary can be determined in the lower blocks.

Similarly, the left or right boundary is determined by detecting vertical edges (column-direction edges) in the left-most or rightmost unit blocks using a filter and formula shown in FIG. 18B.

In the present embodiment, a boundary is determined based on the total number of the vertical edges or horizontal edges. Thus, it is possible to detect even a moving image region on a confusing background. Further, detection accuracy is increased, and jitter of the moving image region is reduced.

Figure 11:
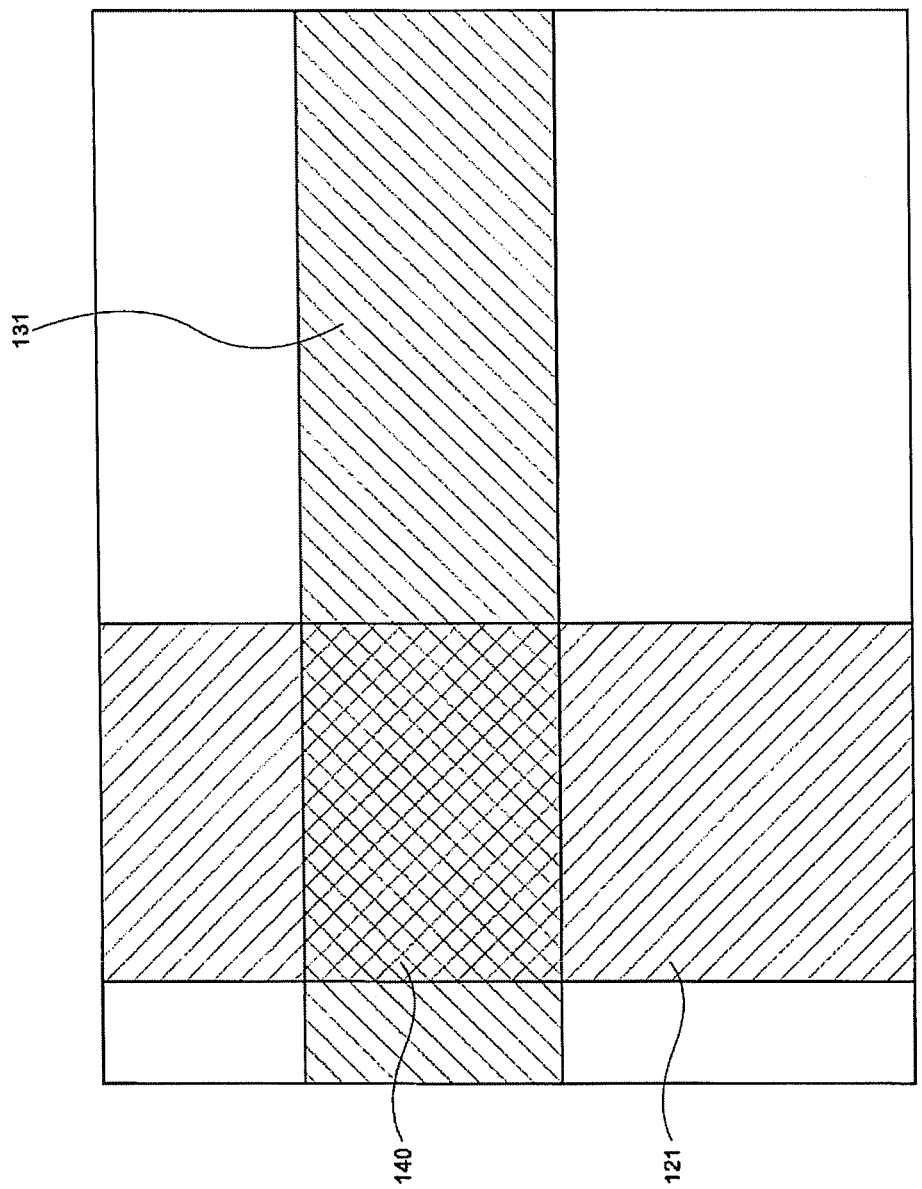
FIG. 11 is a diagram showing a moving image region 140.

In the present embodiment, the pixels in all the blocks other than the blocks serving as ends, of the blocks obtained in FIG. 11 are used to obtain a boundary. Alternatively, a determination may be made using some of these pixels.

In the present embodiment, the total number of the edges in one line is compared with the threshold ths. Alternatively, a predetermined number or more of continuously arranged edge pixels may be judged to form a boundary. Since a natural image includes an edge image in some cases, a number of continuously arranged edges which is less than the predetermined number may be excluded from the calculation of the total number.

While the present embodiment is applied to the case where the rectangular region is determined and then the single pixel-based boundaries are obtained in the blocks forming the peripheries of the rectangular region, the present embodiment is also applicable to motion estimation in general and other fields. A multiple pixel-based (e.g., 2*2 pixel-based) boundary may be obtained in place of a single pixel-based boundary.

In the present embodiment, edge pixels are extracted to determine a boundary. Alternatively, by judging whether each of the pixels in the target blocks is a pixel having a motion vector between different frames, the boundary between pixels in which a motion vector can be detected and pixels in which no motion vector can be detected may be judged to be a boundary.

Figure 19A:
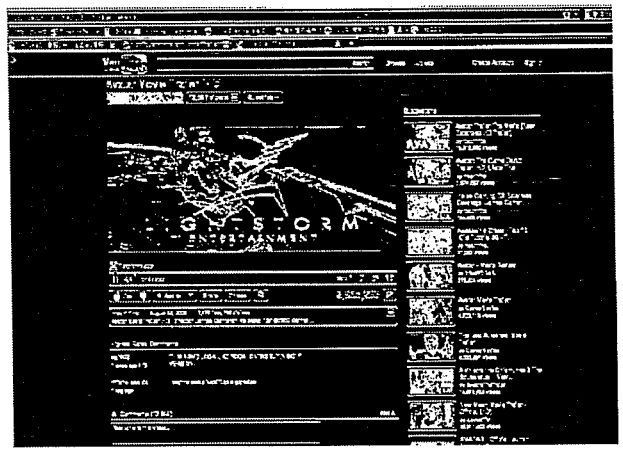
FIGS. 19A to 19C show an example moving image to describe a boundary determination using histories in the time-axis direction.
Figure 19B:
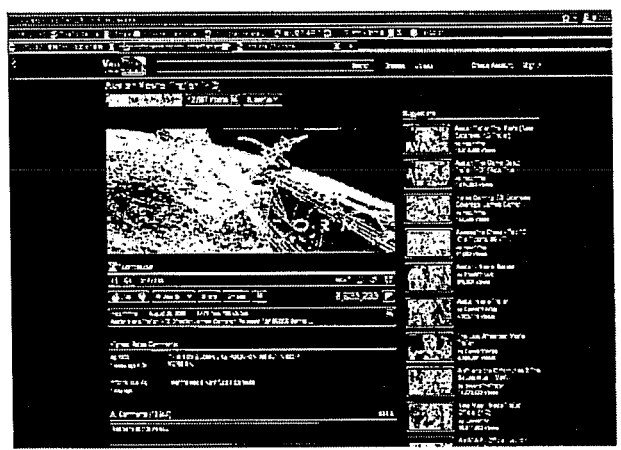
Figure 19C:
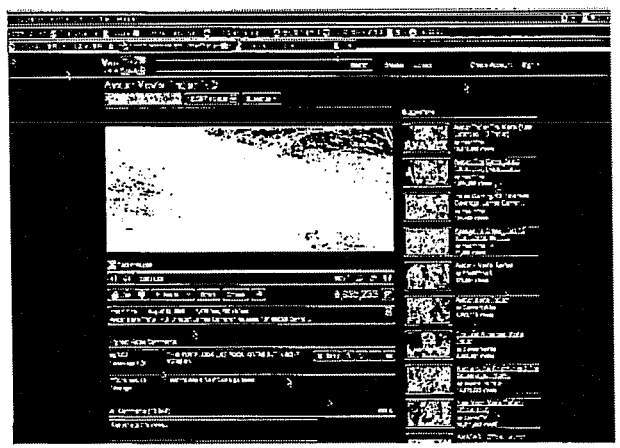

Note that in a particular frame, there may be little difference in luminance between the moving image region and the background. For example, in a frame t shown in FIG. 19A, there is little difference in luminance between the boundaries of the background and the moving image region. It may be impossible to detect the boundaries using only this frame. For this reason, by sequentially storing the boundaries in each frame, the stored boundaries may be used when any boundary cannot be detected in one frame. In the present embodiment, a dozen or so frames are stored.

In the present embodiment, there has been described the case where the process of detecting blocks each including multiple pixels (hereafter referred to as the coarse process) is performed first. Alternatively, rectangular boundaries may be determined without this process.

The present embodiment may be applied to an apparatus for determining the rectangular boundaries of a still image rather than to multiple frames.

4. Fourth Embodiment

In the above embodiments, whether a region is a moving image region is judged based on pixel information between frames. However, when text data is being scrolled in a particular rectangular region, the text data may be erroneously judged to be a moving image region. For this reason, as described below, a scroll judgment may be performed and, if it is judged that the text data is being scrolled, a boundary determination may be cancelled.

In horizontally written text data, there is space between character lines. Specifically, horizontally written text data is characterized in that there are many edge pixels in the character-written region of each line, while there is no edge pixel between character lines. Accordingly, whether a region is a moving image region can be determined based on whether the region has such characteristics.

Figure 20:
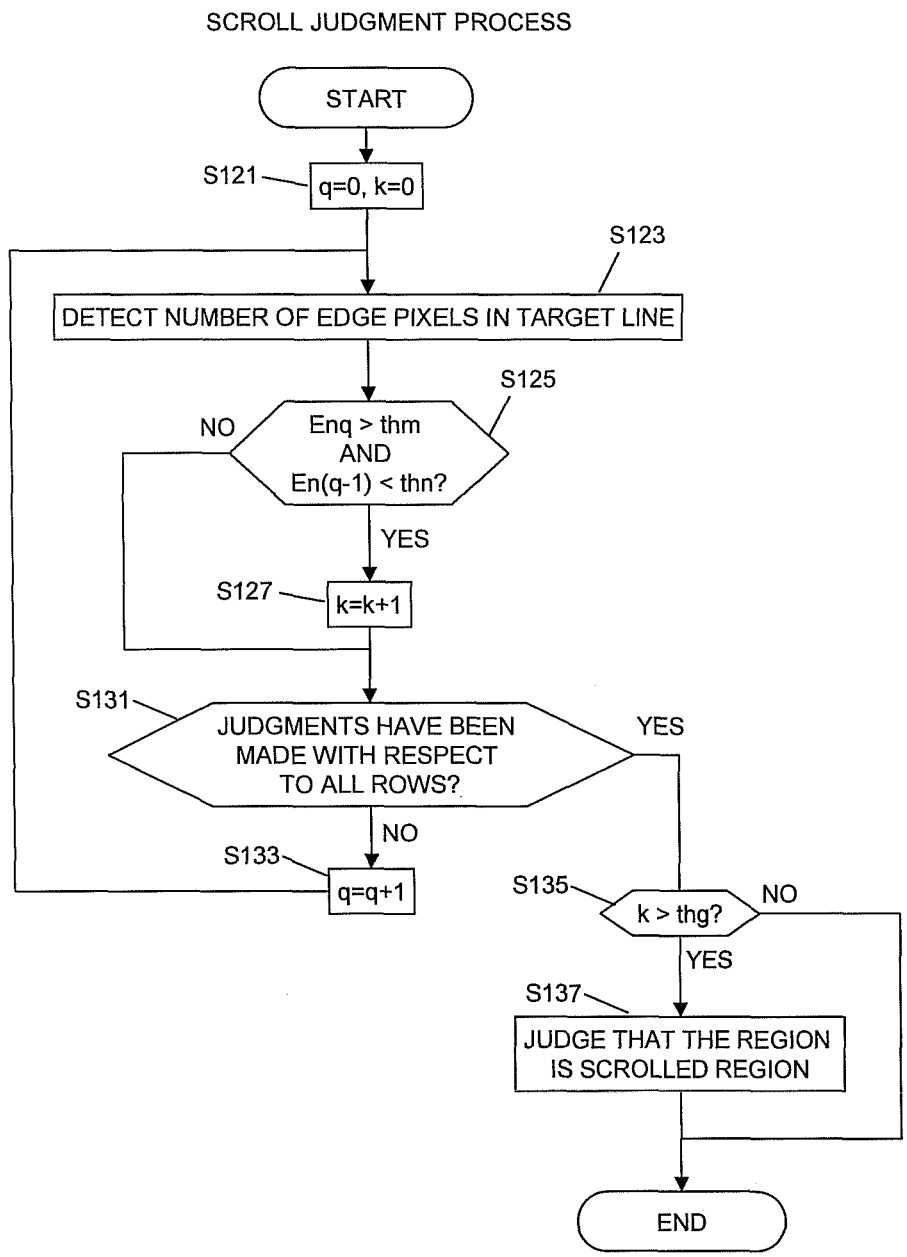
FIG. 20 is a flowchart of a scroll judgment process.

The CPU 23 initializes target row number Q and the number of matching rows k (step S121 of FIG. 20) and calculates the total number of edge pixels Enq in the Q'th row of an extracted block (step S123). Whether a pixel is an edge pixel may be determined based on the difference in luminance between the pixel and an adjacent pixel.

The CPU 23 judges whether the total number of edge pixels Enq exceeds a threshold thm and whether the total number of edge pixels, En(q−1), in the preceding row falls below a threshold thn (step S125). If "YES" in step S125, the CPU 23 increments the number of matching rows k (step S127).

The CPU 23 judges whether judgments have been made with respect to all rows (step S131). If judgments have not been made with respect to all rows, the CPU 23 increments process row number Q (step S133) and repeats steps S123 to S127.

If the CPU 23 judges in step S131 that judgments have been made with respect to all rows, it judges whether the number of matching rows k exceeds a threshold thg (step S135). If the number of matching rows k exceeds the threshold thg, the CPU 23 judges that the motion is being made by scrolling (step S137).

The scroll judgment is performed between steps S7 and S9 of FIG. 3. If the CPU 23 judges that the motion is being made by scrolling, it may cancel step S9.

Thus, when a character region is being scrolled in the browser, it is possible to prevent the region from being determined to be a moving image.

The scroll judgment may be made with respect to some rows in the region rather than with respect to all rows in the region.

While the case where text data is written horizontally has been described in the present embodiment, it is also possible to make a determination with respect to vertically written text data. Note that a scroll judgment need not necessarily be made by the above method and may be made by well-known methods.

While the case where the present embodiment is applied to the scroll judgment in the moving image region determination process has been described, the present embodiment may be applied to scroll judgment in general.

Further, although a particular region is not being scrolled, it is possible to judge whether the particular region is a text region. In this case, the particular region is not limited to a moving image region detected in the moving image region detection process and may be a particular region in an image which may be a still image or moving image.

5. Other Embodiments

While the luminance value is used as the pixel value in the above embodiments, the RGB value or the like may be used.

In the present embodiment, whether a block is a block included in a moving image region is judged based on whether the pixel value varies between the t'th and t+1'th frames, in step S15 of FIG. 5. However, the frames are not limited to the above frames as long as the frames are multiple frames between which there is a time difference. For example, a judgment may be made based on whether the pixel value varies between the t'th and the t+2'th frames. Instead of between the two frames, a comparison may be made among more frames obtained by adding frames preceding and following the two frames, for example, 16 frames.

In the present embodiment, step S9 of FIG. 3, that is, the boundary determination process is optional. If a pixel-based boundary does not need to be obtained, this process does not need to be performed. In the boundary determination process, all pixel values in one row or one column of all peripheral blocks are used. Alternatively, the pixels may be partially thinned out, or a representative value may be used. Instead of all peripheral blocks, some peripheral blocks may be used to make a judgment.

As in step S15 of FIG. 5, a past representative value of the same position may be stored in advance and used for a comparison.

In the above embodiments, one block includes 32*32 pixels but not limited thereto.

If the value of any pixel (e.g., the value of the pixel at the upper left corner of the block) is used in place of the average pixel value or hash value, step S9 of FIG. 3 may include disposing another block around the peripheries of the moving image region and then obtaining the boundaries. For example, if 7*5 blocks are detected as a moving image region in step S7, step S9 is performed using 9*7 blocks, obtained by adding another block to the peripheries.

It is also possible to form a monitor or set-top box including any one of the rectangular moving image region determination apparatuses of the above embodiments. Such a set-top box may be formed as a switching hub for switching the input data destination monitor to another.

In the above embodiments, it is possible to detect a rectangular moving image region with single-pixel precision. It is also possible to determine multiple rectangular moving image regions. Further, it is possible to eliminate a motion of a small region having a small width. For example, it is possible to cope with a quasi-motion of a mouse pointer or the like. Since such a motion can be distinguished from moving regions and still regions in an image, optimal control can be performed.

In the above embodiments, whether a unit block is a moving unit block is judged by the following method: the display region is divided into unit blocks each including a predetermined number of pixels; the representative pixel value of each unit block is calculated based on the values of the predetermined number of pixels included in the unit block; the representative value of each unit block is compared with the representative value of the same unit block in a comparative frame; if the difference between the representative values exceeds the threshold, the unit block is judged to be a moving unit block having a motion. However, the judgment method is not limited to the above method and may be any method as long as the method allows for judgment of whether each unit block is a moving unit block having a motion. For example, as described above, there may be used a well-known moving unit block judgment step in which a comparison is made among the sums of the representative values of the same block in a predetermined number of frames.

In the above embodiments, the functions shown in FIG. 1 are achieved by using the CPU 23 and executing software. Alternatively, some or all of the functions may be achieved by using hardware, such as a logic circuit. Further, part of the program may be executed by the operating system (OS).

DESCRIPTION OF NUMERALS

23 CPU
25 RAM
26 flash memory

The invention claimed is:

1. A method for determining a rectangular moving image region displayed in part of a display region, the display region having pixels arranged in row and column directions therein, the method comprising:
a moving unit block judgment step of dividing the display region into unit blocks each including a predetermined number of pixels and judging whether each unit block is a moving unit block having a motion;
a moving column block determination step of defining, as a column block, a set of unit blocks included in a column of the unit blocks, the column including one of the uppermost unit blocks and, if one column block includes at least one moving unit block, determining the column block as a moving column block;
a moving row block determination step of defining, as a row block, a set of unit blocks included in a row of the unit blocks, the row including one of the leftmost unit blocks and, if one row block includes at least one moving unit block, determining the row block as a moving row block;
a first rectangular moving image region determination step of determining, as a rectangular moving image region, a rectangular region specified by unit blocks included in both the moving row block and the moving column block; and
a second rectangular moving image region determination step of determining, as a boundary of the rectangular moving image region, a region defined by edges in peripheral unit blocks, the peripheral unit blocks forming peripheral four sides of the rectangular moving image region, on the basis of pixels in the peripheral unit blocks, of the unit blocks included in the rectangular moving image region.

2. The method of claim 1, wherein:
the second rectangular moving image region determination step comprises determining a row having a different representative pixel value in the peripheral unit blocks as a row-direction boundary of the rectangular moving image region and determining a column having a different representative pixel value in the peripheral unit blocks as a column-direction boundary of the rectangular moving image region.

3. The method of claim 1, wherein
the second rectangular moving image region determination step comprises determining boundaries of the rectangular moving image region by judging whether each pixel in the peripheral unit blocks is a varying pixel which varies between different frames.

4. The method of claim 1, wherein:
the second rectangular moving image region determination step comprises extracting pixels serving as row-direction edges and pixels serving as column-direction edges from pixels in the peripheral unit blocks and determining boundaries of the rectangular moving image region on the basis of a total number of pixels serving as row-direction edges in each row and a total number of pixels serving as column-direction edges in each column.

5. The method of claim 1, wherein:
prior to the second rectangular moving image region determination step, a scroll judgment is performed, the scroll judgment being a judgment in which it is judged whether an image in the determined rectangular moving image region varies between frames due to scrolling, and if it is judged that the image varies due to scrolling, the second rectangular moving image region determination step is cancelled.

6. The method of claim 5, wherein:
the scroll judgment comprises judging whether each of pixels in the determined rectangular moving image region serves as an edge, on the basis of a difference in pixel value between the pixel and an adjacent pixel, recognizing, as a character gap existence region, a row or column including a predetermined number or more of pixels not serving as edges, and judging whether the image varies due to scrolling, on the basis of a ratio of the character gap existence region to the determined rectangular moving image region.

7. The method of claim 1, wherein:
before the second rectangular moving image region determination step is performed, the moving column block determination step, the moving row block determination step, and the first rectangular moving image region determination step are repeatedly performed on the rectangular moving image region determined in the first rectangular moving image region determination step.

8. An apparatus for determining a rectangular moving image region displayed in part of a display region, the display region having pixels arranged in row and column directions therein, the apparatus comprising:
moving unit block judgment means configured to divide the display region into unit blocks each including a predetermined number of pixels and to judge whether each unit block is a moving unit block having a motion;
moving column block determination means configured to define, as a column block, a set of unit blocks included in a column of the unit blocks, the column including one of the uppermost unit blocks and to, if one column block includes at least one moving unit block, determine the column block as a moving column block;
moving row block determination means configured to define, as a row block, a set of unit blocks included in a row of the unit blocks, the row including one of the leftmost unit blocks and to, if one row block includes at least one moving unit block, determine the row block as a moving row block;
first rectangular moving image region determination means configured to determine, as a rectangular moving image region, a rectangular region specified by unit blocks included in both the moving row block and the moving column block; and
a second rectangular moving image region determination means configured to determine, as boundary of the rectangular moving image region, a region defined by edges in peripheral unit blocks, the peripheral unit blocks forming peripheral four sides of the rectangular moving image region, on the basis of pixels in the peripheral unit blocks, of the unit blocks included in the rectangular moving image region.

9. The apparatus claim 8, wherein:
the second rectangular moving image region determination means determines a row having a different representative pixel value in the peripheral unit blocks forming the peripheral four sides as a row-direction boundary of the rectangular moving image region and determines a column having a different representative pixel value in the peripheral unit blocks as a column-direction boundary of the rectangular moving image region.

10. The apparatus of claim 8, wherein: the second rectangular moving image region determination means determines boundaries of the rectangular moving image region by judging whether each pixel in the peripheral unit blocks is a varying pixel which varies between different frames.

11. The apparatus of claim 8, wherein: the second rectangular moving image region determination means extracts pixels serving as row-direction edges and pixels serving as column-direction edges from pixels in the peripheral unit blocks and determines boundaries of the rectangular moving image region on the basis of a total number of pixels serving as row-direction edges in each row and a total number of pixels serving as column-direction edges in each column.

12. The apparatus of claim 8, further comprising:
repetition means configured to cause the moving column block determination means, the moving row block determination means, and the first rectangular moving image region determination means to repeatedly perform processes on the rectangular moving image region determined by the first rectangular moving image region determination means.

13. A monitor comprising the apparatus of claim 8.

14. A set-top box comprising the apparatus of claim 8.

15. The set-top box of claim 14, wherein
the set-top box is a switching hub for switching an input data destination monitor to another.

16. A non-transitory computer readable medium storing a program for causing a computer to perform a process of determining a rectangular moving image region displayed in part of a display region, the display region having pixels arranged in row and column directions therein, the program causing the computer to function as:
moving unit block judgment means configured to divide the display region into unit blocks each including a predetermined number of pixels and to judge whether each unit block is a moving unit block having a motion;
moving column block determination means configured to define, as a column block, a set of unit blocks included in a column of the unit blocks, the column including one of the uppermost unit blocks and to, if one column block includes at least one moving unit block, determine the column block as a moving column block;
moving row block determination means configured to define, as a row block, a set of unit blocks included in a row of the unit blocks, the row including one of the leftmost unit blocks and to, if one row block includes at least one moving unit block, determine the row block as a moving row block;
first rectangular moving image region determination means configured to determine, as a rectangular moving image region, a rectangular region specified by unit blocks included in both the moving row block and the moving column block; and
a second rectangular moving image region determination means configured to determine, as a boundary of the rectangular moving image region, a region defined by edges in peripheral unit blocks, the peripheral unit blocks forming peripheral four sides of the rectangular moving image region, on the basis of pixels in the peripheral unit blocks, of the unit blocks included in the rectangular moving image region.

* * * * *